US012602882B2

(12) United States Patent (10) Patent No.: US 12,602,882 B2

Nakamori et al. (45) Date of Patent: Apr. 14, 2026

(54) AUGMENTED REALITY DISPLAY DEVICE AND AUGMENTED REALITY DISPLAY SYSTEM

(71) Applicant: MAXELL, LTD., Kyoto (JP)

(72) Inventors: Hiroshi Nakamori, Kyoto (JP); Megumi Kurachi, Kyoto (JP); Mayumi Nakade, Kyoto (JP)

(73) Assignee: MAXELL, LTD., Kyoto (JP)

( * ) Notice: Subject to any disclaimer, the term of this patent is extended or adjusted under 35 U.S.C. 154(b) by 173 days.

(21) Appl. No.: 18/576,781

(22) PCT Filed: Jul. 9, 2021

(86) PCT No.: PCT/JP2021/025968
§ 371 (c)(1),
(2) Date: Jan. 5, 2024

(87) PCT Pub. No.: WO2023/281736
PCT Pub. Date: Jan. 12, 2023

(65) Prior Publication Data
US 2024/0312152 A1 Sep. 19, 2024

(51) Int. Cl.
*G06T 19/00* (2011.01)
*G06T 5/50* (2006.01)

(52) U.S. Cl.
CPC .............. *G06T 19/006* (2013.01); *G06T 5/50* (2013.01); *G06T 2207/20221* (2013.01)

(58) Field of Classification Search
CPC .................... G06T 19/006; G06T 5/50; G06T 2207/20221; G06T 2200/24;
(Continued)

(56) References Cited

U.S. PATENT DOCUMENTS 10,685,400 B1 * 6/2020 Brandmaier ........... G06Q 40/08
2005/0257748 A1 * 11/2005 Kriesel ................... A22B 5/007
119/51.02
(Continued)

FOREIGN PATENT DOCUMENTS

JP 2014-167716 A 9/2014
JP 2017-120329 A 7/2017
(Continued)

OTHER PUBLICATIONS

Omid, M., Khojastehnazhand, M., & Tabatabaeefar, A. (2010). Estimating volume and mass of citrus fruits by image processing technique. Journal of food Engineering, 100(2), 315-321.*
(Continued)

*Primary Examiner* — Sarah Lhymn
(74) *Attorney, Agent, or Firm* — Mattingly & Malur, PC

(57) ABSTRACT

An augmented reality display device comprises: a display; an out-camera for capturing an image of a field of view of a user; a range sensor configured to measure a distance to each of a plurality of measurement points on a real object to be captured by the out-camera; and a processor connected to the display, the out-camera, and the range sensor, respectively, and the processor is configured to: detect a type of the real object captured in a captured image generated by the out-camera; recognize a three-dimensional shape of the real object based on distance data to each of the measurement points detected by the range sensor; estimate a volume of the real object based on the three-dimensional shape of the real object; and display, on the display, an augmented reality image indicating a physical quantity of the real object which is based on the volume.

7 Claims, 19 Drawing Sheets

(58) Field of Classification Search
CPC . G06T 2207/10028; G06T 7/62; G06T 19/00;
G01B 11/24
See application file for complete search history.

(56) References Cited

U.S. PATENT DOCUMENTS

| | | | |
|---|---|---|---|
| 2012/0105473 A1* | 5/2012 | Bar-Zeev | G06T 1/20 |
| | | | 345/633 |
| 2013/0301901 A1* | 11/2013 | Satish | G01N 21/25 |
| | | | 382/134 |
| 2014/0270480 A1* | 9/2014 | Boardman | G06T 17/00 |
| | | | 382/154 |
| 2015/0379892 A1 | 12/2015 | Sako et al. | |
| 2016/0005329 A1 | 1/2016 | Sako et al. | |
| 2016/0239080 A1* | 8/2016 | Marcolina | G06F 3/04815 |
| 2017/0228885 A1* | 8/2017 | Baumgartner | H04N 13/204 |
| 2018/0352144 A1* | 12/2018 | Miao | G06T 7/73 |
| 2019/0094981 A1* | 3/2019 | Bradski | G06V 40/168 |
| 2020/0167944 A1* | 5/2020 | Ono | G01B 11/022 |
| 2020/0211243 A1* | 7/2020 | Ulusoy | G06T 11/60 |
| 2022/0301192 A1* | 9/2022 | Boardman | G06T 7/579 |
| 2023/0337636 A1* | 10/2023 | Shmigelsky | G06V 30/147 |

FOREIGN PATENT DOCUMENTS

| | | | | |
|---|---|---|---|---|
| JP | 2019-015553 A | 1/2019 | | |
| JP | 2019-016322 A | 1/2019 | | |
| JP | 2019-020131 A | 2/2019 | | |
| KR | 20160118899 A | * 10/2016 | ............ | G06Q 50/08 |
| WO | 2014/132521 A1 | 9/2014 | | |
| WO | 2020/203764 A1 | 10/2020 | | |

OTHER PUBLICATIONS

Nyalala, I., Okinda, C., Nyalala, L., Makange, N., Chao, Q., Chao, L., . . . & Chen, K. (2019). Tomato volume and mass estimation using computer vision and machine learning algorithms: Cherry tomato model. Journal of Food Engineering, 263, 288-298.*

Stütz, T., Dinic, R., Domhardt, M., & Ginzinger, S. (Sep. 2014). Can mobile augmented reality systems assist in portion estimation? A user study. In 2014 IEEE international symposium on mixed and augmented reality-media, art, social science, humanities and design (ISMAR-MASH'D) (pp. 51-57). IEEE.*

Standley, T., Sener, O., Chen, D., & Savarese, S. (Oct. 2017). image2mass: Estimating the mass of an object from its image. In Conference on Robot Learning (pp. 324-333). PMLR.*

International Search Report of PCT/JP2021/025968 dated Sep. 21, 2021.

* cited by examiner

Figure 5:
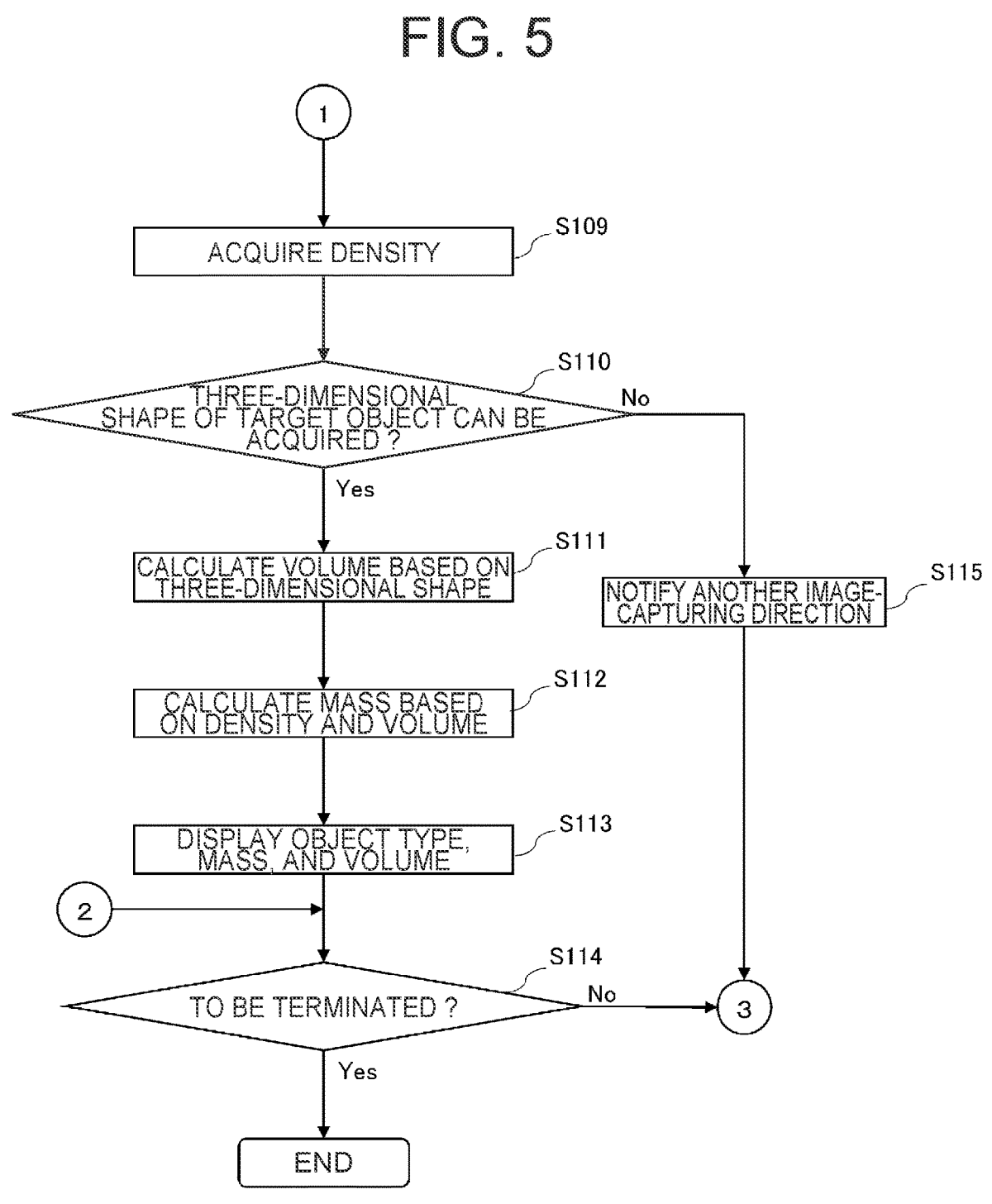

ACQUIRE DENSITY — S109

↓

S110
THREE-DIMENSIONAL SHAPE OF TARGET OBJECT CAN BE ACQUIRED ? — No

Yes ↓

CALCULATE VOLUME BASED ON THREE-DIMENSIONAL SHAPE — S111

NOTIFY ANOTHER IMAGE-CAPTURING DIRECTION — S115

↓

CALCULATE MASS BASED ON DENSITY AND VOLUME — S112

↓

DISPLAY OBJECT TYPE, MASS, AND VOLUME — S113

(2) →

↓

TO BE TERMINATED ? — S114 — No → (3)

Yes ↓

END

FIG. 8

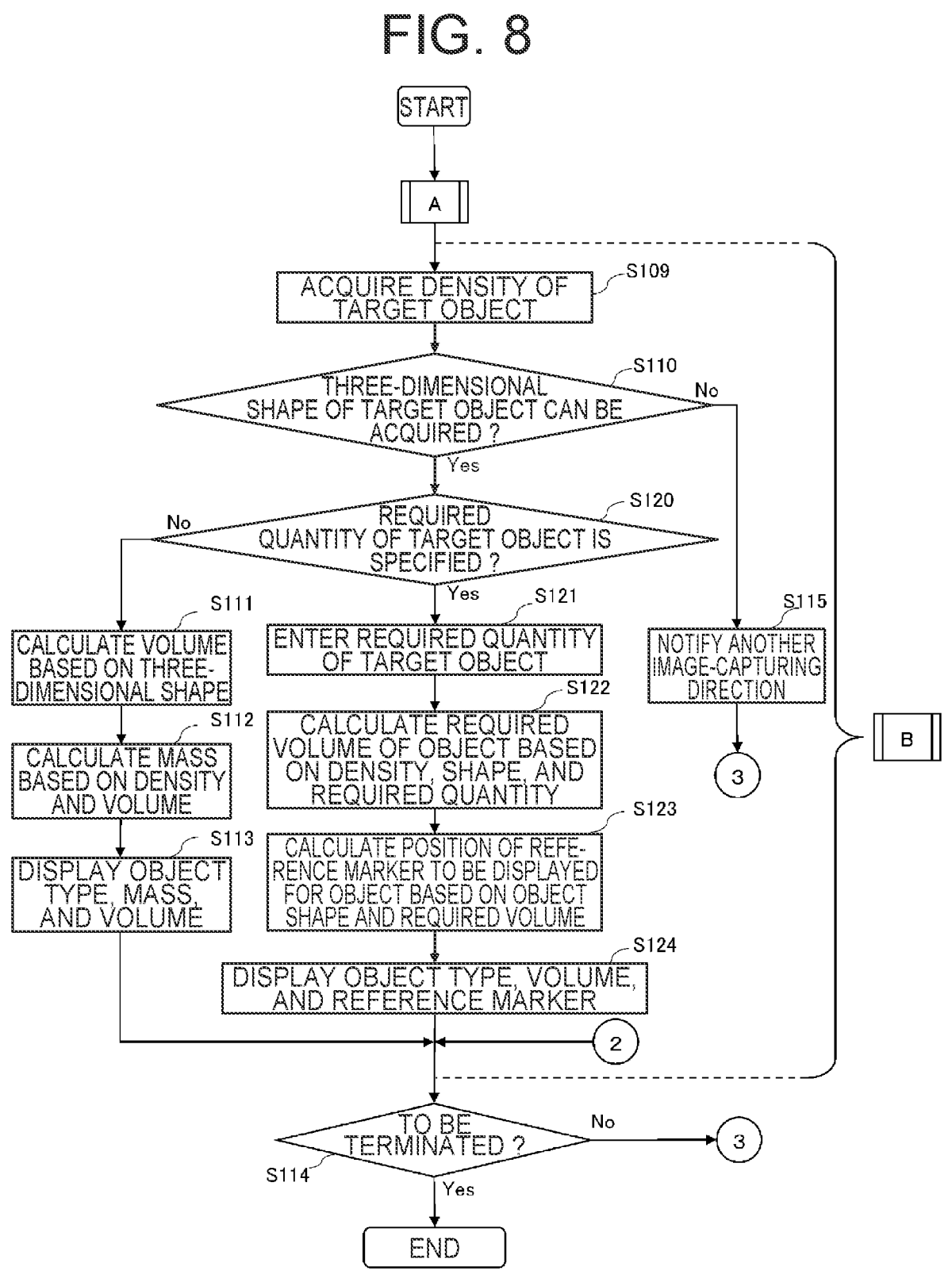

START

A

ACQUIRE DENSITY OF TARGET OBJECT — S109

THREE-DIMENSIONAL SHAPE OF TARGET OBJECT CAN BE ACQUIRED ? — S110

No

Yes

REQUIRED QUANTITY OF TARGET OBJECT IS SPECIFIED ? — S120

No

Yes — S121

CALCULATE VOLUME BASED ON THREE-DIMENSIONAL SHAPE — S111

ENTER REQUIRED QUANTITY OF TARGET OBJECT

NOTIFY ANOTHER IMAGE-CAPTURING DIRECTION — S115

CALCULATE MASS BASED ON DENSITY AND VOLUME — S112

CALCULATE REQUIRED VOLUME OF OBJECT BASED ON DENSITY, SHAPE, AND REQUIRED QUANTITY — S122

3

B

DISPLAY OBJECT TYPE, MASS, AND VOLUME — S113

CALCULATE POSITION OF REFERENCE MARKER TO BE DISPLAYED FOR OBJECT BASED ON OBJECT SHAPE AND REQUIRED VOLUME — S123

DISPLAY OBJECT TYPE, VOLUME, AND REFERENCE MARKER — S124

2

TO BE TERMINATED ? — S114

No

3

Yes

END

FIG. 14

AUGMENTED REALITY DISPLAY DEVICE AND AUGMENTED REALITY DISPLAY SYSTEM

TECHNICAL FIELD

The present invention relates to an augmented reality display device and an augmented reality display system.

BACKGROUND ART

Patent Literature 1 discloses, as an example of an information processing device having a measurement assistance function, an "information processing device comprising: an estimation unit that estimates the usage quantity for at least either ingredients to be cooked or seasoning to be used during cooking, on the basis of signals detected by a sensor; an indices calculation unit that calculates prescribed cooking indices, in accordance with the results of estimation by the estimation unit; and a notification control unit that controls so as to notify the cooking indices calculated by the indices calculation unit" (excerpted from Abstract).

CITATION LIST

Patent Literature

Patent Literature 1: WO2014/132521

SUMMARY OF INVENTION

Technical Problem

In Patent Literature 1, identification of an object and estimation of the mass are carried out based on the information obtained by capturing images or information obtained from an odor sensor and various concentration sensors (salinity sensor and sugar sensor) installed in an external cooking tool. Accordingly, for example, if the color of a plurality of different objects is the same and also no difference can be observed based on the information detected by the sensors, the objects cannot be identified from each other. Furthermore, in Patent Literature 1, an external device in which the sensors are installed has to be separately prepared.

Still further, the information obtained by capturing images is two-dimensional information from which the size of an object cannot be accurately known, and accordingly, there is a possibility that the estimated value of the mass greatly deviates from the actual value.

Therefore, an object of the present invention is to provide an augmented reality display device and system capable of calculating and notifying the physical quantity of an object more suitably.

Solution to Problem

In order to solve the problems described above, the present invention includes the features described in the scope of claims. One of the aspects of the present invention is an augmented reality display device for displaying an augmented reality image, comprising: a display; an out-camera for capturing an image of a field of view of a user; a range sensor configured to measure a distance to each of a plurality of measurement points on a real object to be captured by the out-camera; and a processor connected to the display, the out-camera, and the range sensor, respectively; the processor being configured to: detect a type of the real object captured in a captured image generated by the out-camera; recognize a three-dimensional shape of the real object based on distance data to each of the measurement points detected by the range sensor; estimate a volume of the real object based on the three-dimensional shape of the real object; and display, on the display, an augmented reality image indicating a physical quantity of the real object, which is based on the volume.

Advantageous Effects of Invention

According to the present invention, it is possible to provide an augmented reality display device and system capable of calculating and notifying the physical quantity of an object more suitably. The problems, configurations, and advantageous effects other than those described above will be clarified by explanation of the embodiments below.

BRIEF DESCRIPTION OF DRAWINGS

FIG. 5 illustrates a flowchart of operations of an HMD according to the first embodiment.

FIG. 8 illustrates a flowchart of operations of an HMD according to the second embodiment.

FIG. 14 illustrates an example of an augmented reality display system.

DESCRIPTION OF EMBODIMENTS

The present invention, from which diversification and technological improvements can be expected for labor-intensive industries, contributes to, for example, 8.2 "Achieve higher levels of economic productivity through diversification, technological upgrading and innovation, including through a focus on high-value added and labor-intensive sectors" of SDGs (Sustainable Development Goals) proposed by the United Nations. Hereinafter, exemplified embodiments of the present invention will be described with reference to the drawings. Throughout the drawings, the same components are provided with the same reference signs, and repetitive explanation therefor will be omitted.

First Embodiment

The first embodiment is the embodiment for displaying the physical quantity (at least either one of the volume or the mass) of a real object on a display as an augmented reality image by means of an assistance function for measuring the weight of the real object, using a head-mounted display as an augmented reality display device.

Figure 1:
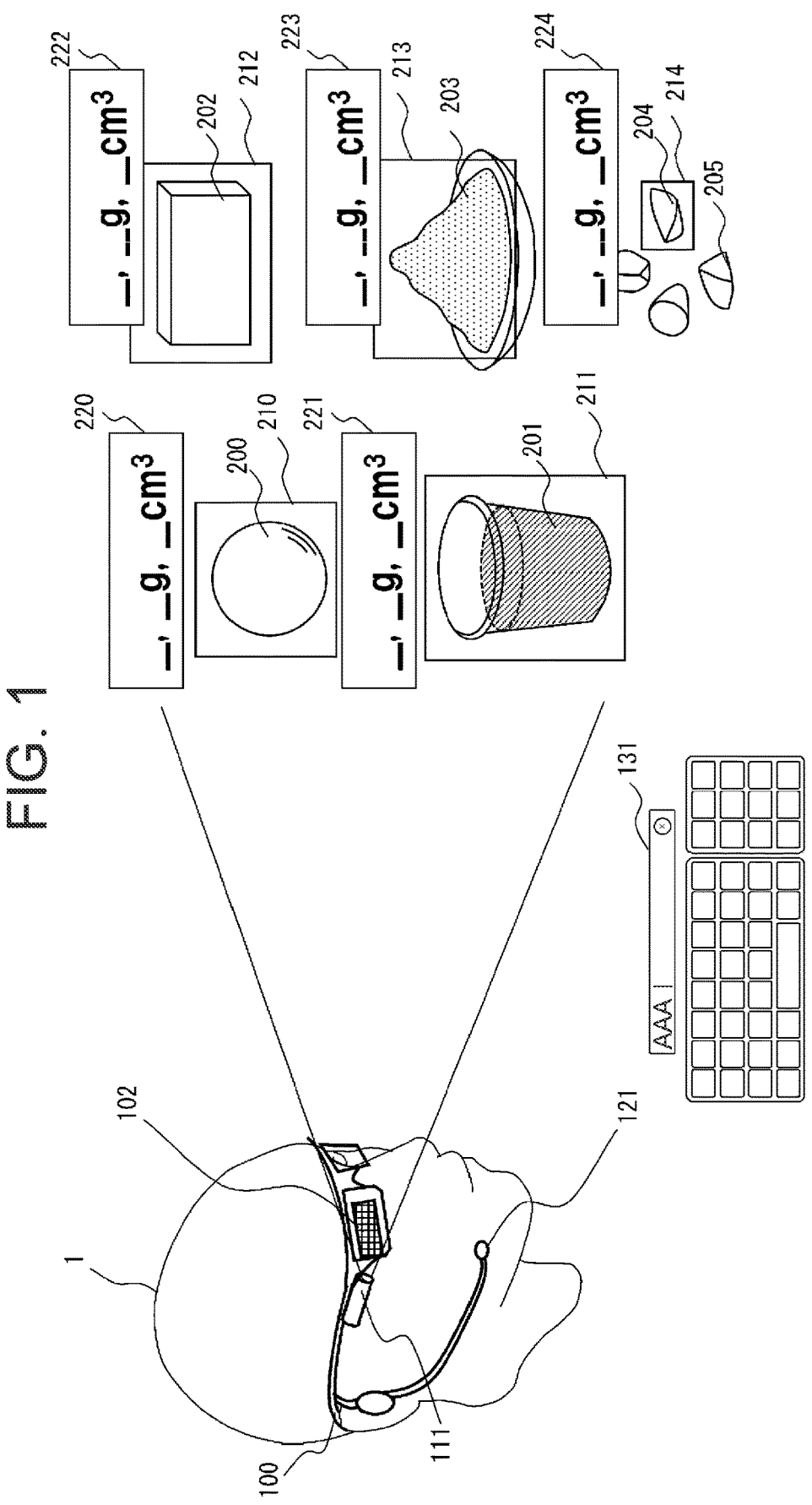
FIG. 1 illustrates the outline of an augmented reality display device according to the first embodiment.

FIG. 1 illustrates the outline of an augmented reality display device according to the first embodiment.

An HMD 100 illustrated in FIG. 1 includes a display 102 of a transparent type. A user 1 wearing the HMD 100 can view, on the display 102, an augmented reality image (hereinafter, referred to as an "AR image") displayed being superimposed on a real object viewed through the display 102.

Upon recognizing target objects 200, 201, 202, 203, 204 of which the physical quantities are to be estimated from among the real objects captured by an out-camera 111 mounted on the HMD 100, the HMD 100 displays frames 210, 211, 212, 213, 214 that surround the target objects, respectively.

Then, the HMD 100 estimates the physical quantity of each of the target objects 200, 201, 202, 203, 204, and displays, on the display 102, AR images with measurement result fields 220, 221, 222, 223, 224 in which the results of the estimation are shown. At this time, on the display 102, the measurement result fields 220, 221, 222, 223, 224 are displayed at the positions near the target objects 200, 201, 202, 203, 204, respectively.

In each of the measurement result fields 220, 221, 222, 223, 224, the name and physical quantity of a target object are displayed. Here, the physical quantity may be the volume of a target object, or if the density thereof is known, may be the mass converted from the volume and density. In the present embodiment, the mass and volume are used as physical quantity.

In the captured image by the out-camera 111, a real object 205 appears together with the target objects 200, 201, 202, 203, 204, however, the real object 205 is not recognized as the target object by the HMD 100. Accordingly, no frame is provided to the real object 205 and thus the physical quantity thereof is not estimated, much less and the result thereof is not displayed.

If the result of recognition of the types of the target object 200, 201, 202, 203, 204, which are obtained by the HMD 100 based on the captured image by the out-camera 111, are to be corrected, the user 1 may enter type correction information by audio input via a microphone 121 of the HMD 100, or text input based on a gesture action. This gesture action may be performed with respect to an AR image such as a text input UI 131 displayed on the display 102 so that it can be recognized via the out-camera 111 or the range sensor 167 and entered as text.

Figure 2:
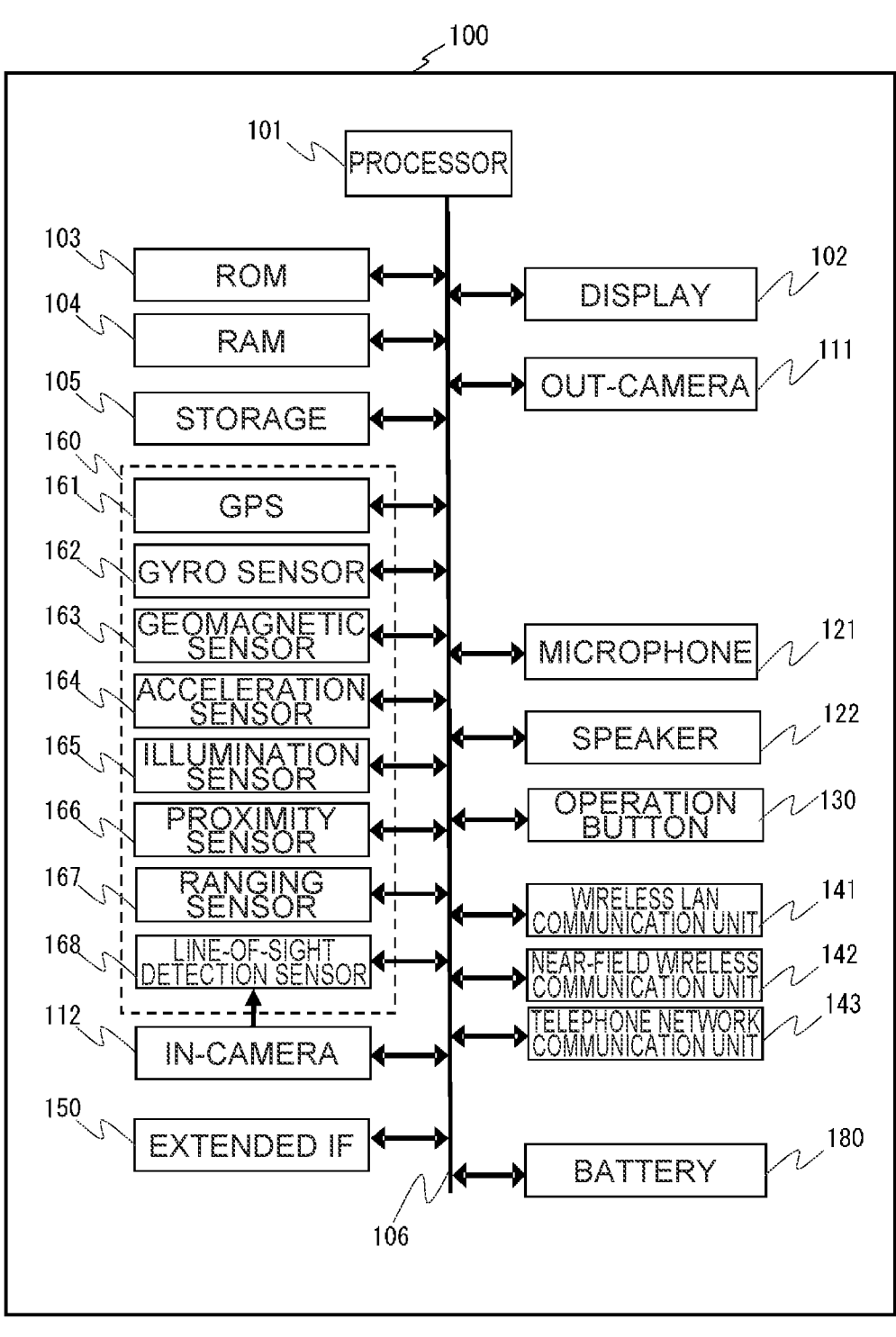
FIG. 2 is a hardware configuration diagram of an HMD.

FIG. 2 is a hardware configuration diagram of the HMD 100.

The HMD 100 includes a processor 101, the display 102, a ROM 103, a RAM 104, a storage 105, the out-camera 111, an in-camera 112, the microphone 121, a speaker 122, an operation button 130, a wireless LAN communication unit 141, a near-field wireless communication unit 142, a telephone network communication unit 143, an extended I/F 150, a group of sensors 160, and a battery 180, which are connected to each other via a bus 106.

The group of sensors 160 may include a GPS (Global Positioning System) 161, a gyro sensor 162, a geomagnetic sensor 163, an acceleration sensor 164, an illuminance sensor 165, a proximity sensor 166, a range sensor 167, and a line-of-sight detection sensor 168.

The range sensor 167 may be a ToF (Time Of Fright) sensor or an ultrasonic sensor, or the out-camera 111 may serve as the range sensor 167 if it is a stereo camera, using its function capable of measuring a distance to a real object based on the parallax of both the eyes. The out-camera 111 configured with a ToF camera can be used as the range sensor 167.

The ROM 103 or the storage 105 stores the measurement assistance program for the HD 100.

Figure 3:
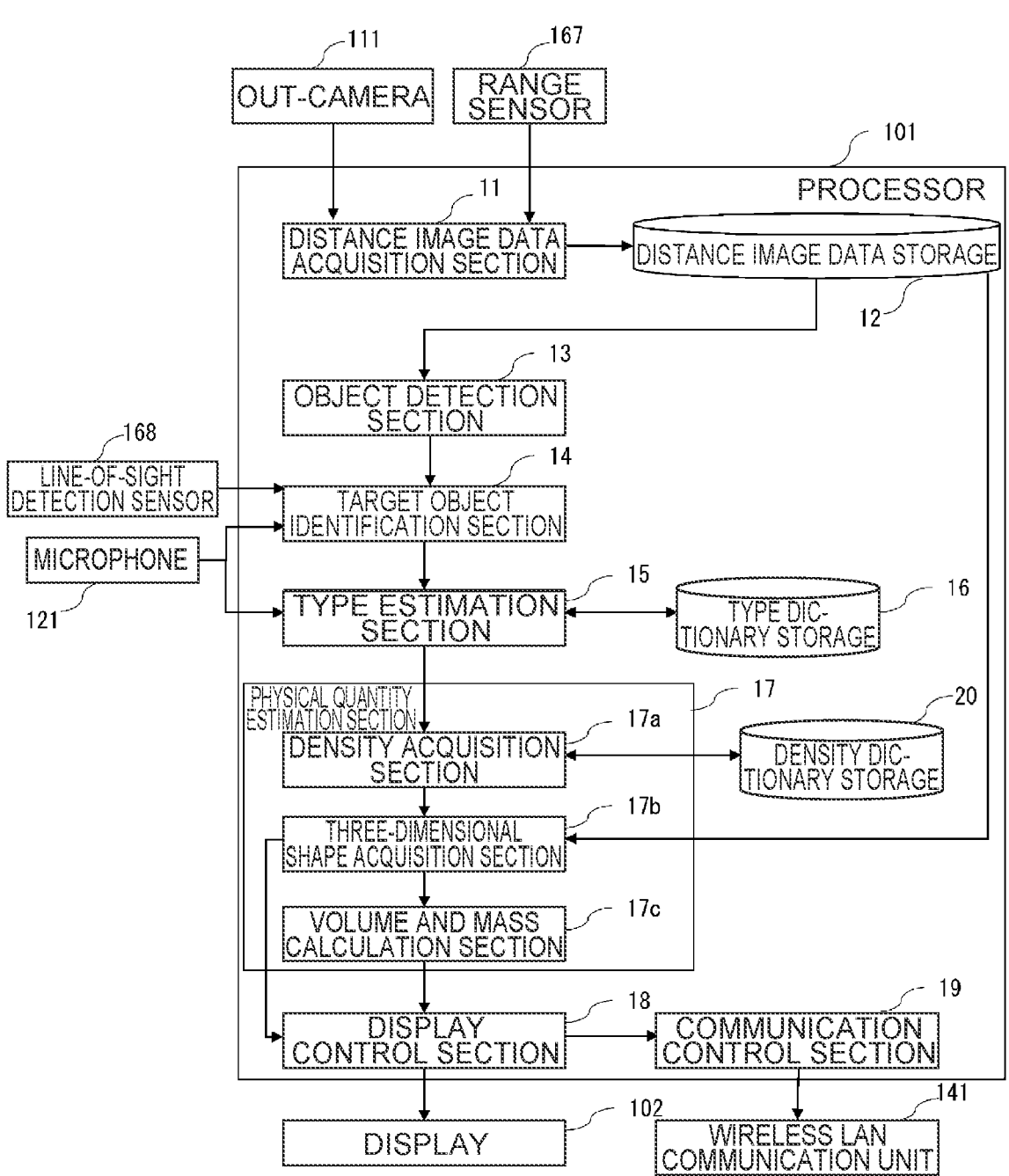
FIG. 3 is a block diagram of an exemplified measurement assistance program to be executed by a processor of an HMD.

FIG. 3 is a block diagram of an exemplary configuration of a measurement assistance program to be executed by the processor 101 of the HMD 100.

The measurement assistance program includes a distance image data acquisition section 11, a distance image data storage 12, an object detection section 13, a target object identification section 14, a type estimation section 15, a type dictionary storage 16, a physical quantity estimation section 17, a display control section 18, a communication control section 19, and a density dictionary storage 20. The physical quantity estimation section 17 includes a density acquisition section 17a, a three-dimensional shape acquisition section 17b, and a volume and mass calculation section 17c. The processor 101 loads and executes the measurement assistance program on the RAM 104, thereby implementing the functions of each of the sections. The processor 101 may be configured with an integrated circuit that implements the same functions as those of the measurement assistance program. Details of the processing by each of the sections will be described with reference to the flowcharts illustrated in FIG. 4 and thereafter.

The measurement assistance program may be executed by the HMD 100 and a server or an information processing device, and in this case, the result of the execution is returned to the HMD 100 so that it can be displayed on the display 102.

Figure 4:
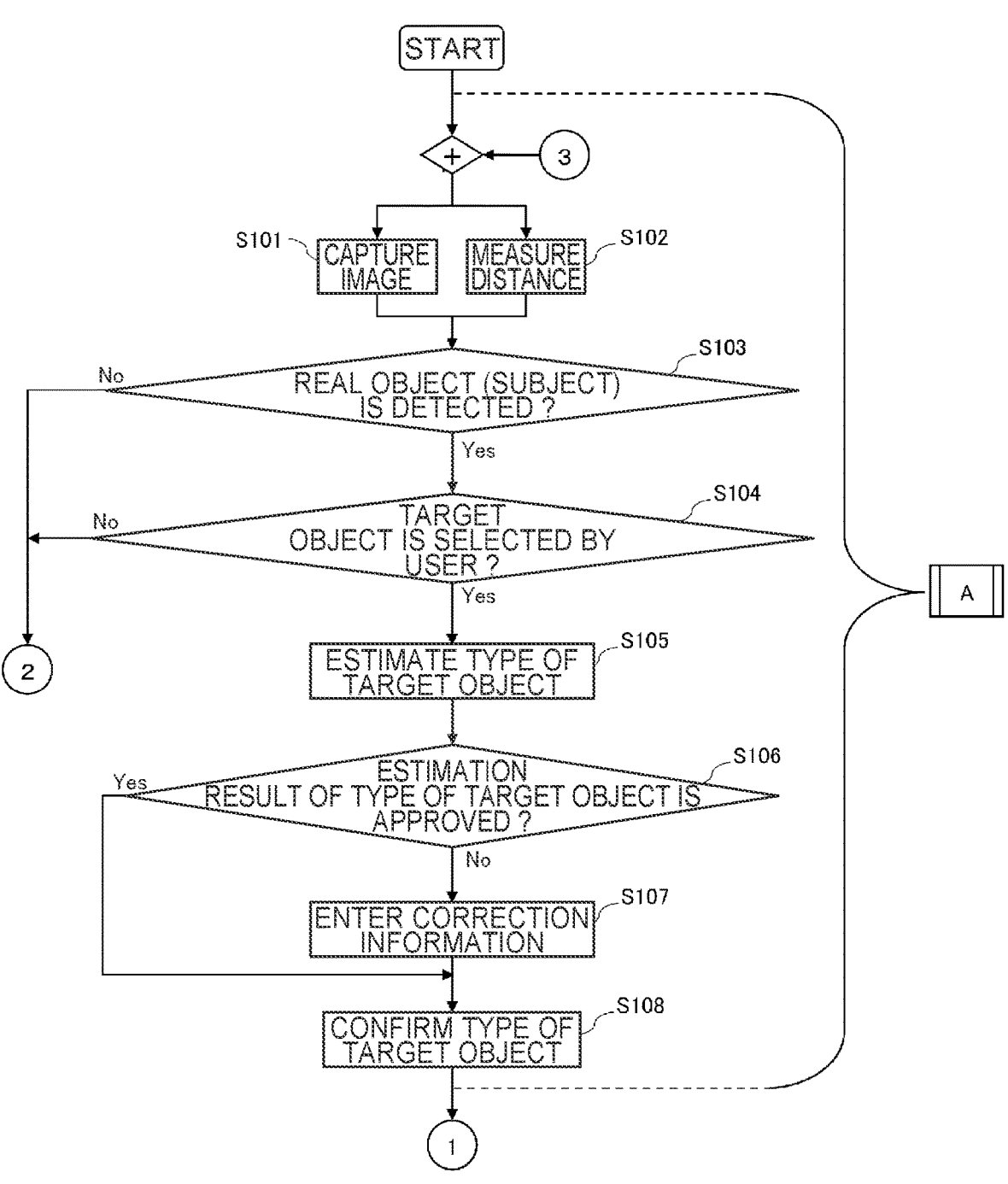
FIG. 4 illustrates a flowchart of operations of an HMD according to the first embodiment.
Figure 6:
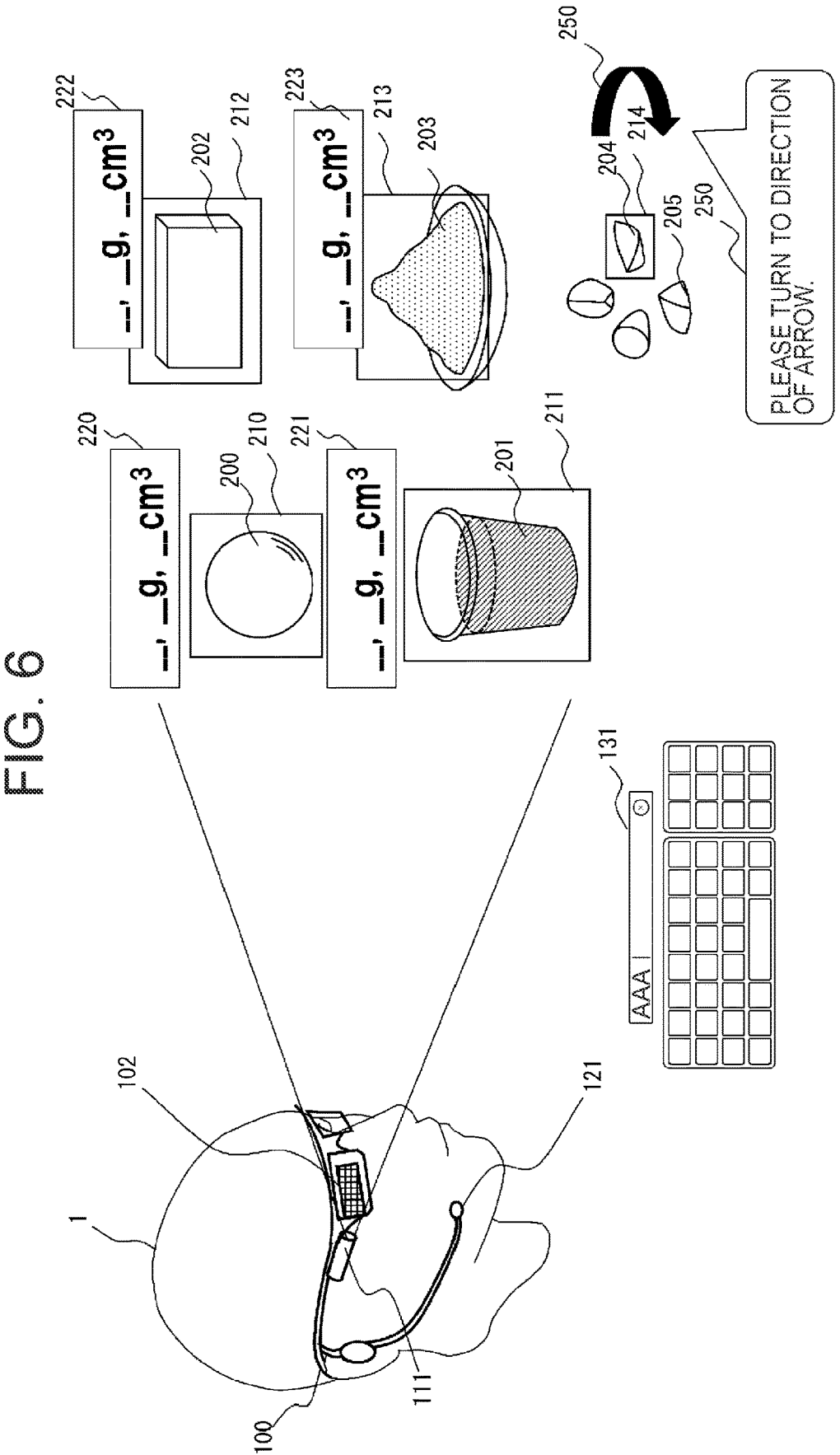
FIG. 6 illustrates an exemplified display of a rescanning notification.

Referring to FIG. 4 to FIG. 6, the operations of the HMD 100 according to the first embodiment will be described. Each of FIG. 4 and FIG. 5 illustrates a flowchart of the operations of the HMD 100 according to the first embodiment. FIG. 6 illustrates an exemplified display of a rescanning notification.

The flowchart of FIG. 4 starts when the main power of the HMD 100 is turned on. The out-camera 111 captures an image of a scene of the outside and outputs the captured image to the distance image data acquisition section 11 (step S101).

A ranging area of the range sensor 167 includes an angle of view of the out-camera 111. The range sensor 167 synchronizes with the out-camera 111, measures a distance, and outputs distance measurement data to the distance image data acquisition section 11 (step S101). The distance image data acquisition section 11 stores distance image data in which the image capturing data and the distance data are associated with each other in the distance image data storage 12 (step S102).

The object detection section 13 reads the distance image data from the distance image data storage 12. The object detection section 13 carries out the subject detection processing on the distance image data, and detects a real object (subject) captured in the captured image (step S103).

When the object detection section 13 detects at least one object (step S103: Yes) and the user 1 selects a real object (referred to as a "target object") of which the physical quantity is to be measured (step S104: Yes), the type estimation section 15 estimates the type of the target object (step S105).

As an example of a method of selecting a target object, a method using the line-of-sight detection sensor 168 will be described. The line-of-sight detection sensor 168 acquires an image of the face of the user 1 captured by the in-camera 112, and detects a line of sight from the area where the eye is captured. When the line of sight remains at the real object detected by the object detection section 13 for a predetermined time or longer, the target object identification section 14 recognizes that the real object has been selected as the target object.

Alternatively, for example, the object detection section 13 may display, on the display 102, a plurality of frames 210, 211, 212, 213, 214 enclosing the areas in which the real objects detected from the image capturing data have been captured, respectively. When the user 1 performs a gesture action for specifying the frames 210, 211, 212, 213, 214, the gesture action is captured in the captured image captured by the out-camera 111. The target object identification section 14 analyzes the gesture action based on the distance image data and recognizes whether the target object has been selected. In the case of input using a gesture action, it can be said that the out-camera 111 corresponds to an example of an information input device.

Furthermore, the target object identification section 14 may be configured to recognize the audio data collected by the microphone 121 to identify whether the target object has been selected. In this case, it can be said that the microphone 121 corresponds to an example of an information input device.

If the object detection section 13 does not detect any subject at all (step S103: No) or the target object identification section 14 has not accepted selection of a target object (step S104: No), and when use of the measurement assistance function of the HMD 100 is continued (step S114: No, see FIG. 5), a new captured image and distance measurement data are acquired (steps S101, S102).

The type estimation section 15 extracts image features such as the shape and color of the target object and compares them with image features of various real objects registered in the type dictionary storage 16, so as to estimate the type of the target object. The type dictionary may be stored on a server connected to the HMD 100 by communication so that the HMD 100 transmits a request for type estimation to the server as needed and receives the result of estimation.

Alternatively, the type estimation section 15 may be configured to recognize characters, figures, and symbols provided on the surface of the target object or on a package placed around the target object, so as to estimate the type of the target object.

The type estimation section 15 notifies the user 1 of the result of estimation of the type of the object by displaying it on the display 102 or outputting it by means of audio data from the speaker 122. When the user 1 approves the result of estimation (step S106: Yes), the type of the target object is confirmed (step S108).

If not approving the result of estimation (step S106: No), the user 1 can enter type correction information (step S107). For example, the user 1 can correct the type which has been estimated as "sugar" by the type estimation section 15 by entering "granulated sugar" or "salt". For accepting the input of the correction information, the voices uttered by the user 1 may be collected using the microphone 121 so that the type estimation section 15 can carry out the audio analysis processing. Alternatively, text input information based on a gesture action, which is performed by the user 1 with respect to an AR image such as the text input UI 131 displayed on the display 102 so that the type estimation section 15 can analyze the text input information may be used to accept the input of the correction information. In this case, the gesture action is recognized by the out-camera 111 and the range sensor 167 and entered as text. The type of the target object is confirmed when the input of the correction or supplementary information is accepted (step S108).

The processing from step S101 to step S108 is the processing for confirming the type of a target object (illustrated as processing "A" in FIG. 4).

When the type of the target object has been confirmed (step S108), the density acquisition section 17a of the physical quantity estimation section 17 acquires the density of this type (step S109). The density acquisition section 17a may acquire the density referring to a density dictionary stored on the server connected to the HMD 100 by communication. Alternatively, the density dictionary storage 20 may be provided in advance in the storage 105 of the HMD 100.

The type dictionary and the density dictionary may be prepared in accordance with the scene in which the HMD 100 is used. For example, in the case of using the HMD 100 for assisting cooking, it is expected that, in addition to measurement of the quantities of various seasonings (for example, soy sauce, sauce, butter, margarine, vegetable oil, sugar, salt, Chinese seasonings, and the like), measurement of the quantities of wheat flour, bread flour, and water is required, and accordingly, a dictionary storing the image features (colors, shapes, and the like) and densities thereof may be prepared as a cooking dictionary. In addition, preferably, the image features and densities of various vegetables, meat, and processed products (such as tofu) are also stored therein as cooking ingredients.

In the case of using the HMD 100 for assisting gardening, the image features and density of the type of soil, for example, black soil, red clay soil, Kanuma soil, humus soil, and the like are preferably stored in a dictionary.

In the case of plastering work, the image features and densities of real objects, such as various plaster wall materials, water, and cement, which are to be used in various scenes requiring measurement of the quantity, are preferably stored in a dictionary.

In the case of the HMD 100 with sufficiently high accuracy in estimation of the physical quantity, it may be used, for example, to measure the quantities of various bases (for example, petrolatum, macrogol, plastibase, and the like) and drugs to be mixed therewith in a dispensing pharmacy, or to prepare chemicals in a laboratory.

Next, the three-dimensional shape acquisition section 17b of the physical quantity estimation section 17 reads the distance image data from the distance image data storage 12 and acquires the three-dimensional shape of the target object (step S110). For acquiring the three-dimensional shape, distances to a plurality of measurement points on the target object from the range sensor 167 (HMD 100) are measured by the range sensor 167, respectively, connection lines connecting the adjacent measurement points are interpolated, and surfaces including the connection lines are reconstructed. Alternatively, the three-dimensional shape of the target object may be acquired by surface-rendering based on the coordinates of the measurement points. The three-dimensional shape to be acquired does not necessarily have to be a complete one, and the level of acquisition may be adjusted in accordance with the usage of the HMD 100.

For whether the three-dimensional shape acquisition section 17b can acquire the three-dimensional shape is determined, for example, it is determined as impossible when the captured distance measurement data of the target object is obtained only from one direction (for example, when a distance in the depth direction of a measurement point is equal to or less than a determination threshold that determines that depth information cannot be obtained), on the other hand, it is determined as possible when the captured distance measurement data obtained in at least two directions, preferably, at least three directions of front, rear, depth directions of a target object is available.

The three-dimensional shape acquisition section 17b, if substantially three-dimensional shape of the target object can be reconstructed (step S110: Yes), the volume and mass calculation section 17c obtains the volume of the three-dimensional shape (step S111), and multiplies the volume as obtained by the density to obtain the mass (step S112).

The volume and mass calculation section 17c outputs the type and physical quantity of the target object to the display control section 18. The display control section 18 generates an AR image with the measurement result field in which the type and physical quantity of the target object are to be displayed, and displays the AR image on the display 102 (step S113). If the measurement assistance function by the HMD 100 is to be continued (step S114: No), the processing returns to step S101.

On the other hand, if determining that the substantially three-dimensional shape of the target object cannot be acquired (step S110: No), the three-dimensional shape acquisition section 17b outputs, to the user 1, a rescanning notification 250 for causing the user 1 to acquire the distance image data of the target object from a different angle illustrated in FIG. 6 (step S115), and the processing returns to step S101.

According to the present embodiment, using the output from the out-camera 111 and the range sensor 167 mounted on the HMD 100, the three-dimensional shape of a target object of which the quantity is to be measured is measured to obtain the volume thereof. Furthermore, if the density is known, the mass of the target object is obtained using the volume and density. This enables calculation of the physical quantity (the volume and the mass converted based on the volume) of an object with high accuracy using the single HMD 100 only, so that the user 1 can be notified with the physical quantity as calculated.

Second Embodiment

The second embodiment is the embodiment for displaying a reference marker as if it appeared to be drawn, in addition to the first embodiment.

Figure 7:
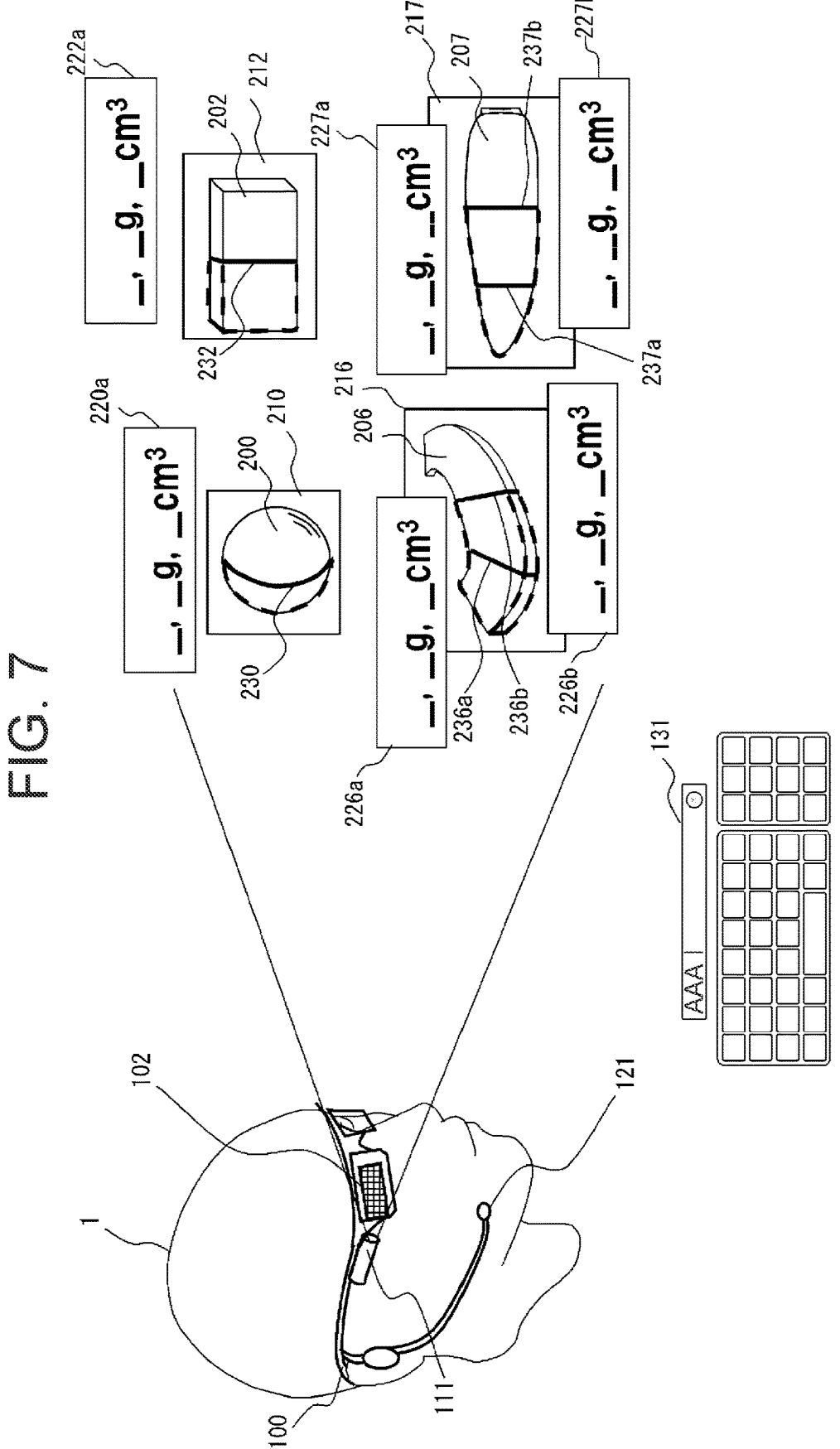
FIG. 7 illustrates the outline of an augmented reality display device according to the second embodiment.

FIG. 7 illustrates the outline of an augmented reality display device according to the second embodiment. For each of target objects 200, 202 illustrated in FIG. 7, a plurality of reference markers 230, 232 indicating, not the whole quantities of the target objects 200, 202 but the required quantities specified by the user 1 for the target objects 200, 202, respectively, are displayed by AR. In required quantity fields 220a, 222a, the object type and the mass and volume corresponding to the required quantities as specified are displayed. The target objects 200, 202 are provided with frames 210, 212, respectively.

Furthermore, for target objects 206, 207, frames 216, 217 are displayed by AR. A plurality of required quantities is specified for each of the target objects 206, 207. Accordingly, for the target object 206, reference markers 236a, 236b and measurement result fields 226a, 226b are displayed by AR, and the physical quantities corresponding to the reference markers are displayed in the measurement result fields 226a, 226b, respectively. In the same manner, for the target object 207, reference markers 237a, 237b and measurement result fields 227a, 227b are displayed, and the physical quantities corresponding to the reference markers are displayed in the measurement result fields 227a, 227b, respectively.

FIG. 8 illustrates a flowchart of the operations of the HMD 100 according to the second embodiment. In the flowchart according to the second embodiment, steps S120 to S124 are added to the flowchart according to the first embodiment.

When the density acquisition section 17a acquires the density of the target object (step S109), the three-dimensional shape acquisition section 17b acquires the three-dimensional shape of the target object (step S110: Yes). For the case of specifying the required quantity of the target object by the user 1 (step S120: Yes), the user 1 enters the required quantity of the target object by audio input via the microphone 121 or text input based on a gesture action. This gesture action is performed with respect to an AR image such as the text input UI 131 displayed on the display 102, so that it can entered as text (step S121).

The volume and mass calculation section 17c calculates the required volume of the target object based on the density and the three-dimensional shape and required quantity of the target object (step S122).

The volume and mass calculation section 17c calculates the position of the reference marker to be displayed for the target object based on the three-dimensional shape and required volume of the target object (step S123).

The volume and mass calculation section 17c outputs, to the display control section 18, the position of the reference marker, the type of the target object, and the mass and volume corresponding to the required quantity, so that the reference marker is superimposed on the real object and displayed by AR. The display control section 18 also displays the measurement result fields 226a, 226b, 227a, 227b by AR on the peripheries of the real objects (step S124). Then, the processing proceeds to step S114.

On the other hand, for the case of not specifying the required quantity of the target object by the user 1 (step S120: No), in the same manner as the first embodiment, the processing proceeds from step S111 to step S114.

According to the present embodiment, in measuring a required quantity which is less than the whole quantity of the target object, dividing the target object along the reference marker displayed by AR on the target object enables the required quantity of the target object to be distinguished from the whole.

Figure 9:
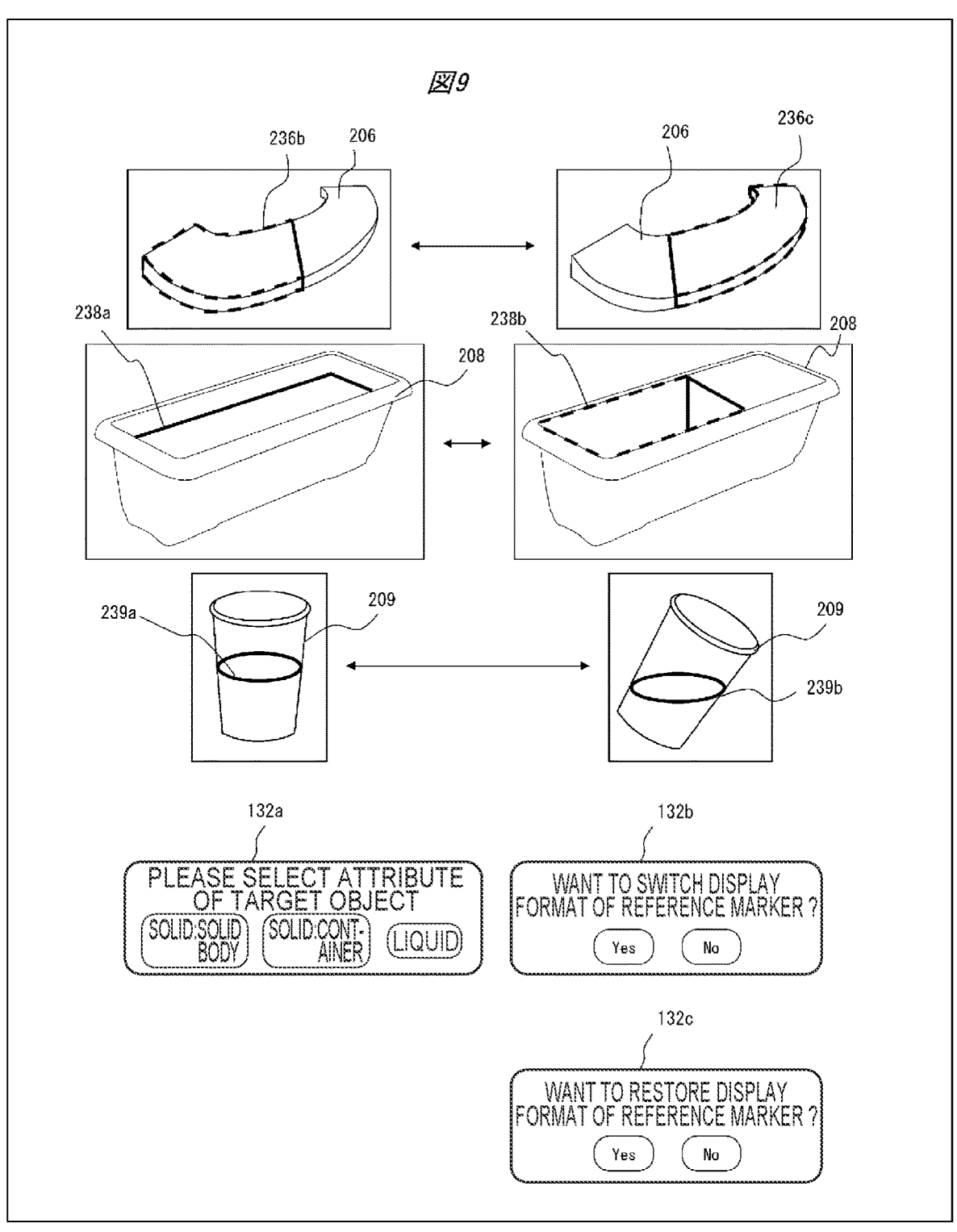
FIG. 9 illustrates an example of change a display position of a reference marker.

FIG. 9 illustrates an example of changing a display position of a reference marker. The area in which the reference marker is to be displayed may be changed. For example, in FIG. 9, the reference marker 236b is displayed in the left area of the target object 206 (for example, a piece of apple). When an operation of changing display of the reference marker is performed in step S124 or thereafter, the volume and mass calculation section 17c executes the processing in step S123 again, such that the display control section 18 can newly display a reference marker 236c on an area different from the area in which the reference marker was initially superimposed and displayed.

In the same manner, as in initial display, a reference marker 238a was displayed so as to divide the internal space of a target object 208 (for example, a planter) in the vertical direction. This may be changed so as to newly display a reference marker 238b which divides the internal space along the depth direction, in response to the operation for changing display of the reference marker.

Furthermore, in initial display, a reference marker 239a kept horizontally has been displayed for a target object 209 (for example, a glass) being in an upright state. This may be changed so as to display a reference marker 239b for the water surface of the liquid kept horizontally while the target object 209 is tilted, in response to an input operation of an instruction to change the display position of the reference marker.

The type of a reference marker to be displayed may be specified by the user 1 by means of audio input via the microphone 121. Alternatively, when identifying the target object, the type estimation section 15 may determine the attribute of a target object as well, so that the volume and mass calculation section 17c can automatically select the reference marker corresponding to the attribute. For example, when it is determined that the attribute of a target object is "solid: solid body", the "reference marker along the outer surface of the target object" may be automatically selected. When it is determined that the attribute is "solid: container", the "reference marker along the storage space of the container" may be automatically selected. When it is determined that the attribute is "liquid", the "reference marker along the inner surface of the container and horizontal water surface" may be automatically selected. At this time, display of a reference marker may be changed based on a gesture action, which is made by the user 1 with respect to AR images such as reference marker display change UIs 132a, 132b, 132c displayed on the display 102 so that it can be recognized via the out-camera 111 and the range sensor 167.

According to the present embodiment, for a target object, specifying a required quantity and providing a reference marker allows only the required quantity to be extracted.

Third Embodiment

The third embodiment is the embodiment for the case where a container and a material (an example of a target object) to be placed in the container are prepared in addition to the second embodiment. In this embodiment, the information about the shape of the material and the information about the shape of the container (an example of a target object) are detected, and the volume in which the mass of the material has approximately a predetermined value and the volume within the container (space) corresponding thereto are obtained, so that a reference marker can be provided to the container in the manner allowing them as obtained to be known.

Figure 10:
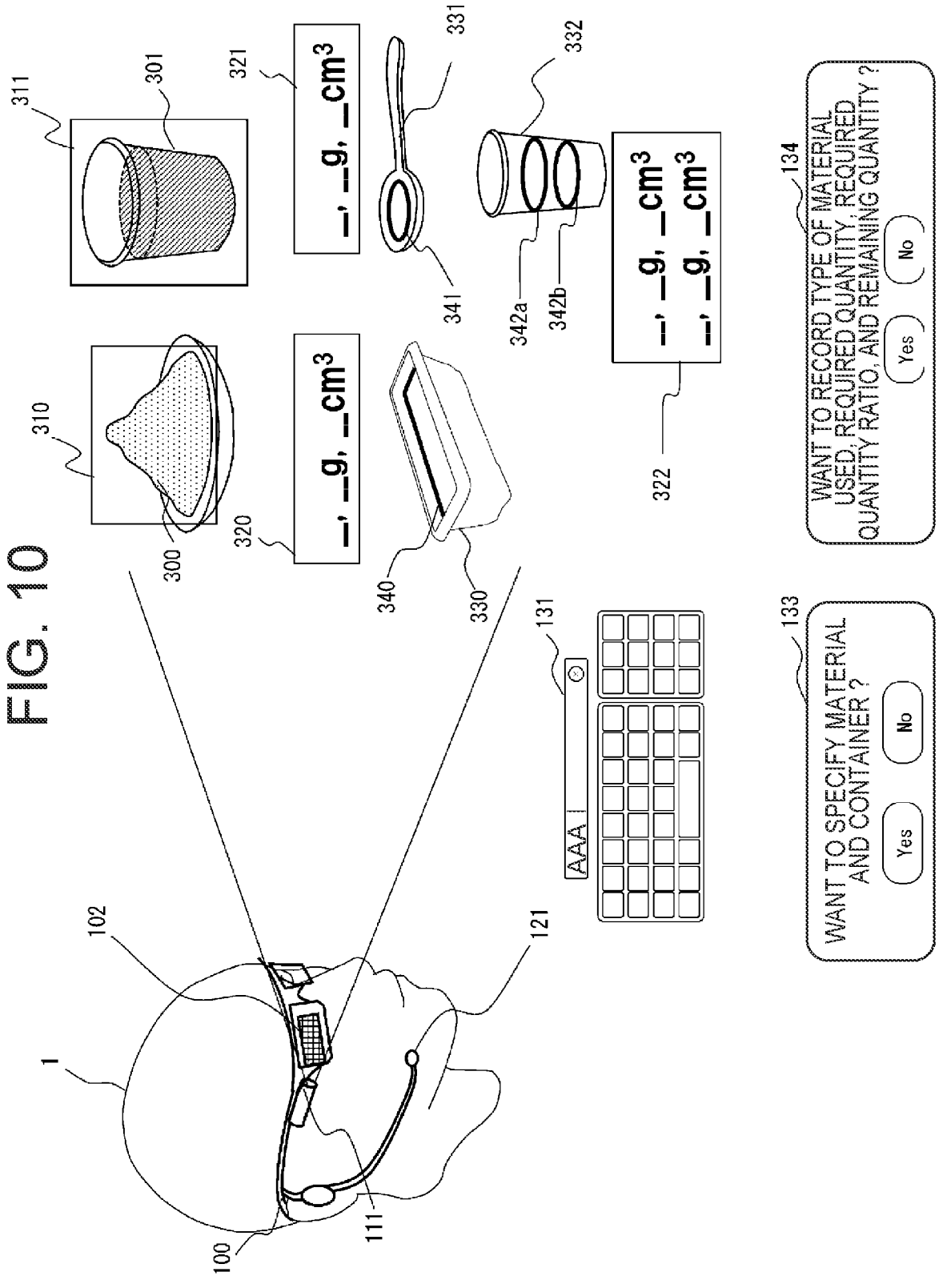
FIG. 10 illustrates the outline of an augmented reality display device according to the third embodiment.

FIG. 10 illustrates the outline of an augmented reality display device according to the third embodiment. In FIG. 10, for example, red clay soil 300 as a material and a planter 330 as a container have been prepared. For the red clay soil

300, a frame 310 indicating that the red clay soil 300 is recognized as a material is displayed by AR. The required quantity of the red clay soil 300 entered by the user 1 is displayed in a required quantity field 320 as the type being "red clay soil" with the value obtained by converting the required quantity into the mass, and the value obtained by converting the required quantity into the volume. For the planter 330, a reference marker 340 indicating how deep the red clay soil 300 reaches if the required quantity of the red clay soil 300 is placed into the planter 330 is superimposed and displayed by AR.

The material may not be limited to a solid, but may be a liquid. For example, in the case of a liquid fertilizer 301 as a material and a spoon 331 as a container, for the liquid fertilizer 301, a frame 311 indicating that the liquid fertilizer 301 has been recognized as a material is displayed by AR. In a required quantity field 321 of the liquid fertilizer 301, the type of material, a value obtained by converting the required quantity into the mass, and a value obtained by converting the required quantity into the volume are displayed. For the spoon 331, a reference marker 341 indicating how deep the liquid fertilizer 301 reaches if the required quantity of the liquid fertilizer 301 is placed into the spoon 331 is superimposed and displayed by AR.

FIG. 10 illustrates a required quantity field 322 in which two required quantities of the liquid fertilizer 301 have been entered. For a cup 332 as a container, reference markers 342a, 342b corresponding the two required quantities, respectively, are displayed. At this time, display of the reference markers may be changed based on a gesture action, which is made by the user 1 with respect to an AR image such as the text input UI 131 displayed on the display 102 so that it can be recognized via the out-camera 111 and the range sensor 167. Furthermore, the result of measurement may be stored by accepting an input operation on a material and container specification UI 133 and a material information recording necessity selection UI 134 displayed as AR images.

Figure 11A:
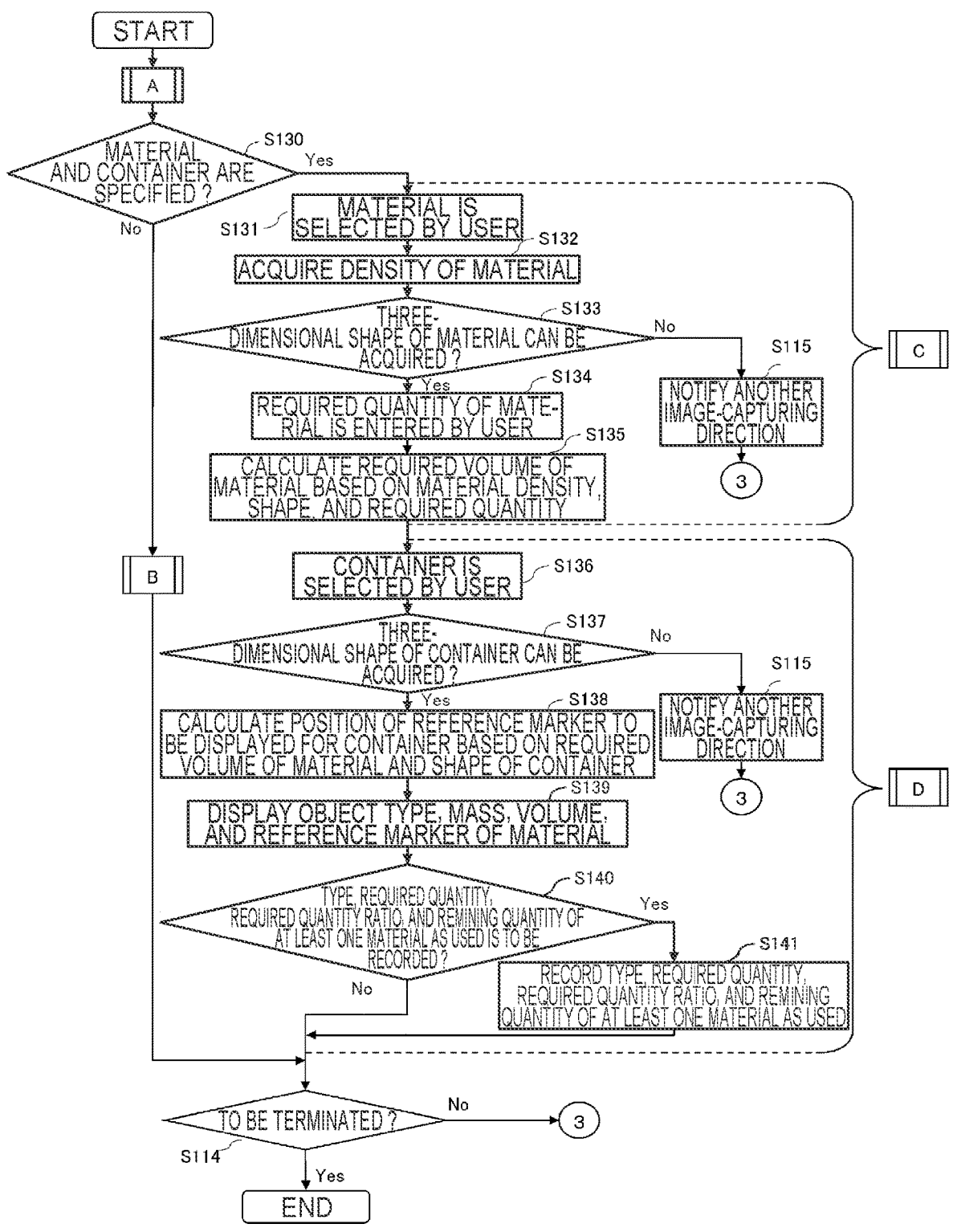
FIG. 11A illustrates the outline of an augmented reality display device according to the third embodiment.

FIG. 11A illustrates a flowchart of the operations of the HMD 100 according to the third embodiment. In the flowchart according to the third embodiment, steps S130 to S141 are added to the flowchart according to the second embodiment.

In response to input for specifying a material and a container by the user 1, which is made by audio input via the microphone 121 or a gesture action made with respect to an AR image such as the material and container specification UI 133 displayed on the display 102 (step S130: Yes), the object detection section 13 provides frames to all the detected objects. When the user 1 selects the frame 310 of the material to be selected by means of a gesture action (step S131), the type estimation section 15 estimates the type of the material and the density acquisition section 17a acquires the density of the material (step S132). If the user 1 enters the type of the material by audio input, the type estimation section 15 may estimate the type based on the information as entered. The frames provided for the unselected real objects are made hidden.

The three-dimensional shape acquisition section 17b acquires the three-dimensional shape of the material (step S133: Yes), and when the user 1 enters the required quantity of the material (step S134), the volume and mass calculation section 17c calculates the required volume of the target object based on the density of the material and the three-dimensional shape and required quantity of the target object (step S135).

Then, the user 1 selects a container (step S136). A container may be selected by an operation, in which the user 1 performs a gesture action, for example, pointing to the container so that it can be recognized by the object detection section 13. Alternatively, a frame of a material and a frame of a container may be selected in step S131. Thus, any type of operation may be employed for selection.

When the three-dimensional shape acquisition section 17*b* acquires the three-dimensional shape of the container (step S137: Yes), the volume and mass calculation section 17*c* calculates the position of a reference marker to be displayed for the container based on the required volume of the material and the shape of the container (step S138).

The volume and mass calculation section 17*c* outputs the position of the reference marker, the type of the material, and the mass and volume corresponding to the required quantity to the display control section 18, so that the reference marker can be superimposed on the container and displayed by AR. The display control section 18 also displays required quantity fields 320, 321 at positions near the container (step S139).

The processor 101 displays the material and container specification UI 133 and the material information recording necessity selection UI 134. The type, required quantity, required quantity ratio, and remaining quantity of at least one material are recorded (step S141) if recording thereof is necessary (step S140: Yes).

After recording the remaining quantity (step S141) or if the recording is not necessary (step S140: No), when the recording is to be continued (step S114: No), capturing images (step S101) and measurement of distance (step S102) are carried out again. When the processing is to be terminated (step S114: Yes), the sequence of the processing described above is made ended.

If the three-dimensional shape of the material cannot be acquired (step S133: No) or if the three-dimensional shape of the container cannot be acquired (step S137: No), a new image-capturing direction is notified (step S115), and the processing returns to steps S101, S102.

In the case of not specifying a material and a container by the user 1 (step S130: No), in the same manner as the second embodiment, the density of the target object is acquired (step S109), and the processing proceeds to processing B for displaying the object type, mass, volume, and reference marker (step S124). When the processing is to be continued (step S114: No), capturing images (step S101) and measurement of distance (step S102) are carried out again. When the processing is to be terminated (step S114: Yes), the sequence of the processing described above is made ended.

According to the present embodiment, in the case where a material and a container for accommodating the material are prepared as target objects, a reference marker for the container when the required quantity of the material is placed therein can be displayed.

Figure 11B:
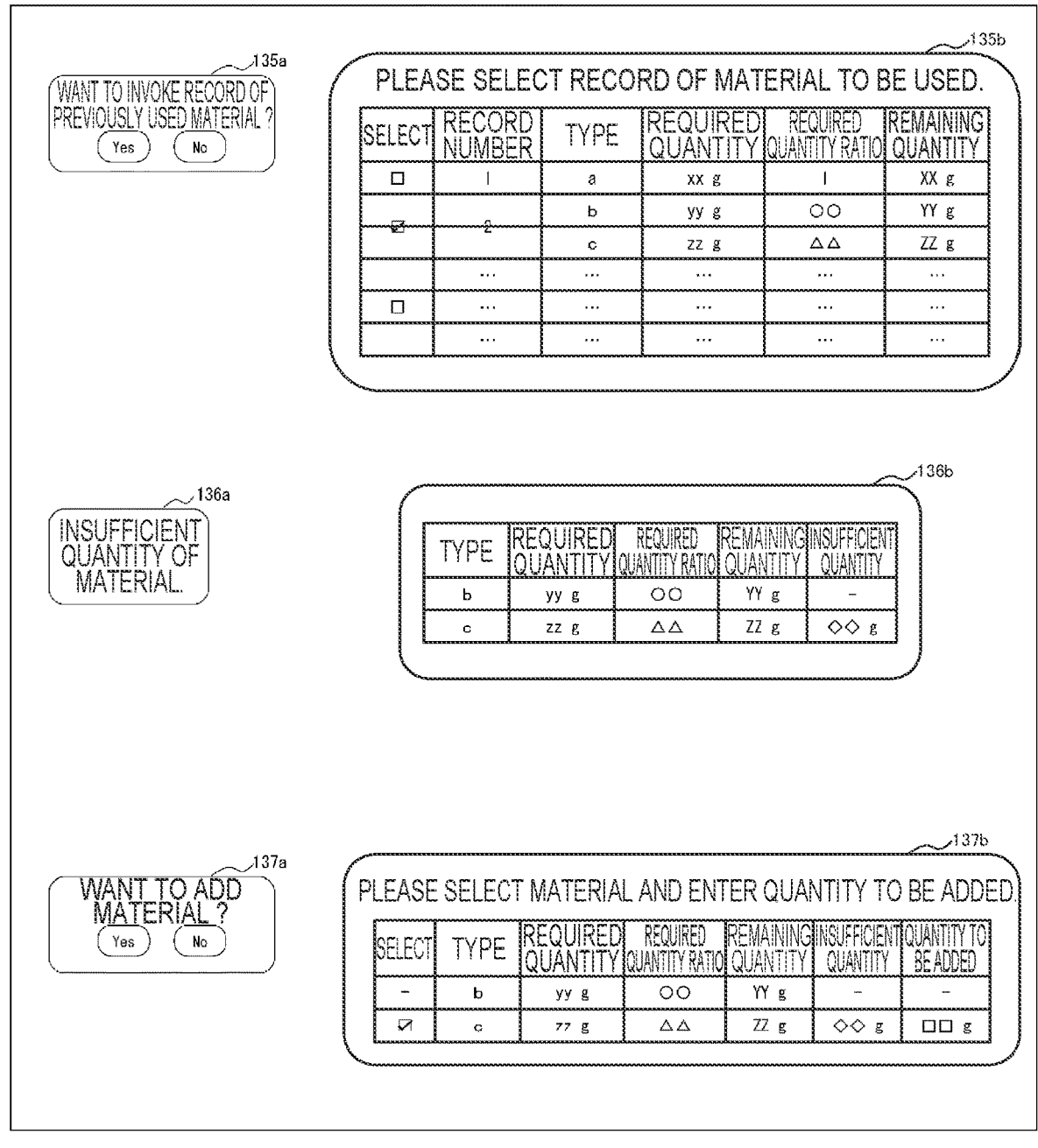
FIG. 11B illustrates an example of screen display to be used in a modification of the third embodiment.
Figure 11C:
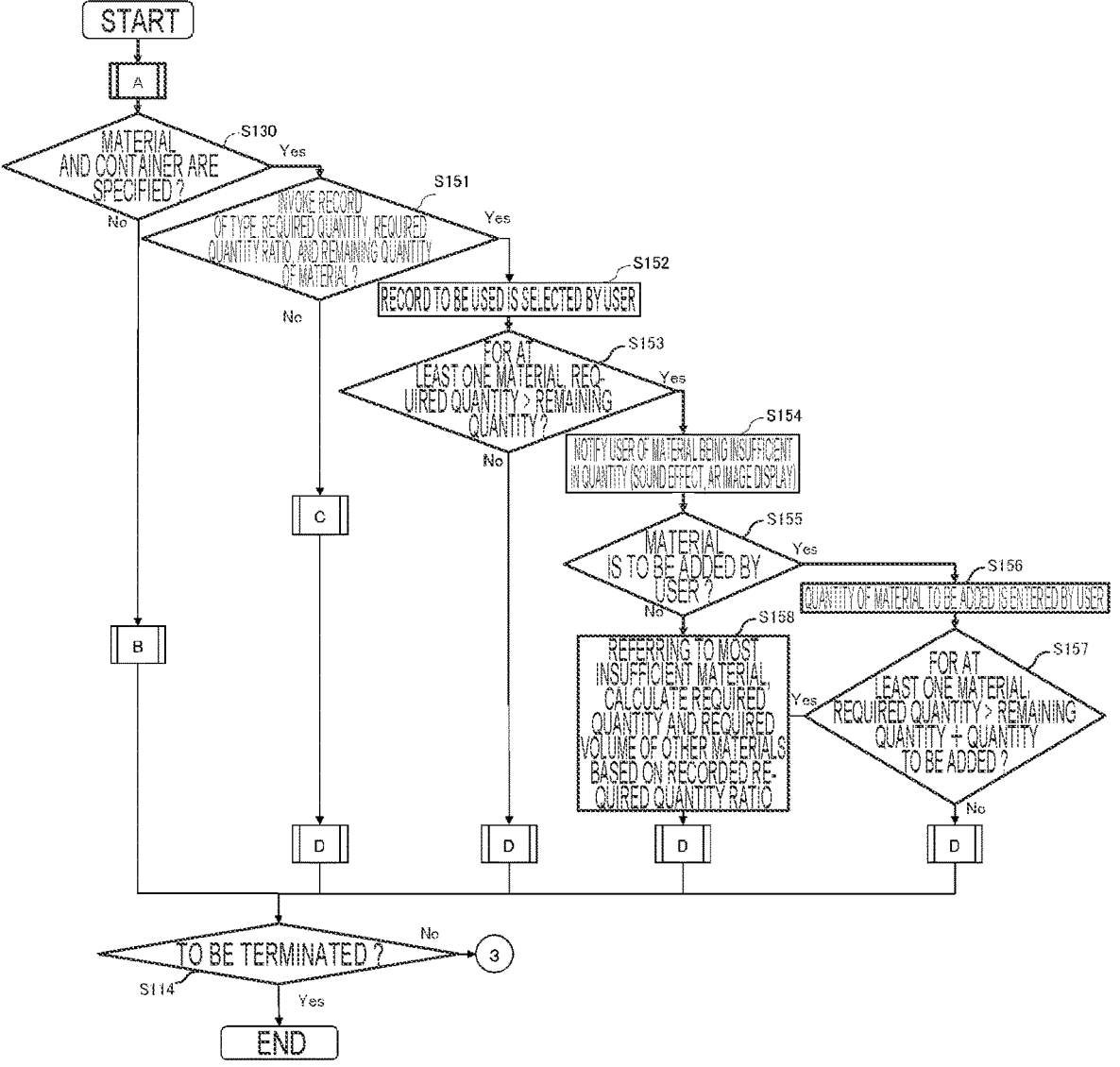
FIG. 11C illustrates a flowchart of operations according to a modification of the third embodiment.

Referring to FIG. 11B and FIG. 11C, an exemplary processing for the case of recording information about a target object (material) in step S141 and then using the recorded information will be described.

FIG. 11B illustrates an example of screen display to be used in a modification of the third embodiment.

A material record information invocation UI 135*a* illustrated in FIG. 11B is the UI for confirming whether a record of a previously used material is to be invoked. In response to entry of information for requesting invocation in the material record information invocation UI 135*a*, a material record information UI 135*b* is displayed.

If the quantity of a material is found not to be enough as a result of measurement, a material insufficient notification UI 136*a* is displayed, and furthermore, a material insufficient quantity display UI 136*b* indicating the quantity which is lacking or the like of the insufficient material is displayed. Next, a material addition necessity input UI 137*a* for confirming whether a material is to be added is displayed, and in response to selection of "Yes" (step S155: Yes), a material addition quantity display UI 137*b* is displayed. The user 1 selects a material to be added in the material insufficient quantity display UI 136*b* and enters the quantity to be added (step S156). The quantity to be added may be entered by audio input by the user 1 via the microphone 121 of the HMD 100, or text input based on a gesture action, which is made by the user 1 with respect to an AR image such as the text input UI 131 displayed on the display 102 so that it can be recognized by the out-camera 111 or the range sensor 167.

FIG. 11C illustrates a flowchart of the operations according to the modification of the third embodiment. When a material and a container are specified by means of audio input made by the user 1 via the microphone 121 of the HMD 100, or by means of a gesture action made by the user 1 with respect to an AR image such as the material and container specification UI 133 displayed on the display 102 so that it can be recognized by the out-camera 111 and the range sensor 167 (step S130: Yes), the processor 101 displays the material record information invocation UI 135*a*. In response to selection of "Yes" in the material record information invocation UI 135*a* (step S151: Yes), the processor 101 displays the material record information UI 135*b*. In the material record information UI 135*b*, the user selects a record to be used (step S152).

The processor 101 compares the required quantities with the remaining quantities for all the materials to be used, and when the required quantity of at least one type of material among the materials to be used is more than the remaining quantity thereof (in other words, when the remaining quantities of one or more types of materials are not enough) (step S153: Yes), the processor 101 notifies the user of the quantity of material being insufficient (step S154). For notification, a sound effect may be generated or the material insufficient notification UI 136*a* may be used. Next, the material insufficient quantity display UI 136*b* indicating the quantity and the like which is not enough of each of the materials is displayed.

When the user adds the material (step S155: Yes) and enters the quantity as added of the material (step S156), the processor 101 compares the required quantity with the total quantity of the remaining quantity and the quantity as added for each of all the materials to be used (step S157). At this time, the material insufficient quantity display UI 136*b* is changed to a material additional quantity display UI 137*b* indicating the quantity as added of each of the materials. When the required quantity of at least one type of material among the materials to be used is more than the total quantity thereof (in other words, for one or more types of materials, when the total quantities of the quantities as added and the remaining quantities are still not enough) (step S157: Yes), and when the user does not add the material (step S155: No), the processor 101 calculates the required quantities and required volumes of the other materials based on the recorded required quantity ratio using the material of which the quantity is the most insufficient as the reference (step S158). Thereafter, and also when the required quantity of each of all the materials to be used is less than or equal to the total quantity (step S157: No) (in other words, when the required quantities of all the materials are enough), the user selects the container (step S136). After whether the three-dimensional shape of the container can be acquired is determined (step S137), the processing D in which recording of a material (step S141) is performed is executed as needed. When the processing is to be continued (step S114: No), capturing images (step S101) and measurement of distance (step S102) are carried out again, and when the processing is to be terminated (step S114: Yes), the processing is made ended.

In the case of not specifying a material and a container (step S130: No), the density of the target object is acquired (step S109), and the processing B for displaying the object type, mass, volume, and reference marker is executed (step S124). When the processing is to be continued (step S114: No), capturing images (step S101) and measurement of distance (step S102) are carried out again, and when the processing is to be terminated (step S114: Yes), the processing is made ended. In the process B, if the three-dimensional shape of the target object cannot be acquired (step S110: No), a new image-capturing direction is notified (step S115) so that capturing images (step S101) and measurement of distance (step S102) can be carried out in the other image-capturing direction as notified.

If "No" is selected in the material record information invocation UI 135a (step S151: No), the processing C, in which the user selects a material (step S131), the density of the material is acquired (step S132), the user inputs the required quantity of the material (step S134) if the three-dimensional shape of the material can be acquired (step S133: Yes), and the required volume is calculated (step S135), and the subsequent processing D are carried out. In the processing C and processing D, when the three-dimensional shape of the material cannot be acquired (step S133: No) and when the three-dimensional shape of the container cannot be acquired (step S137: No), a new image-capturing direction is notified (step S115) so that capturing images (step S101) and measurement of distance (step S102) can be carried out in the other image-capturing direction as notified.

In step S153, the case where it is determined that the required quantity of each of all the materials to be used is equal to or less than the remaining quantity (step S153: No) means that the required quantity for each of all the materials is enough, and thus it is not necessary to add materials. In this case, after the user selects a container (step S136) and whether the three-dimensional shape of the container can be acquired is determined (step S137), the processing D for recording a material (step S141) is executed as needed. When the processing is to be continued (step S114: No), capturing images (step S101) and measurement of distance (step S102) are carried out again, and when the processing is to be terminated (step S114: Yes), the processing is made ended. In the processing D, if the three-dimensional shape of the container cannot be acquired (step S137: No), a new image-capturing direction is notified (step S115) and the processing returns to capturing images (step S101) and measurement of distance (step S102).

According to the present embodiment, the result of measurement of the quantity of a material can be stored. In newly measuring the quantity, referring to the results of past measurement enables the required quantity, required quantity ratio, and current remaining quantity for each material to be known. Furthermore, in the case where the remaining quantities vary among materials, using a material of which the remaining quantity is the most insufficient as a reference, the required quantities of other materials can be calculated. This can realize improved usability.

Other Embodiments

Figure 12A:
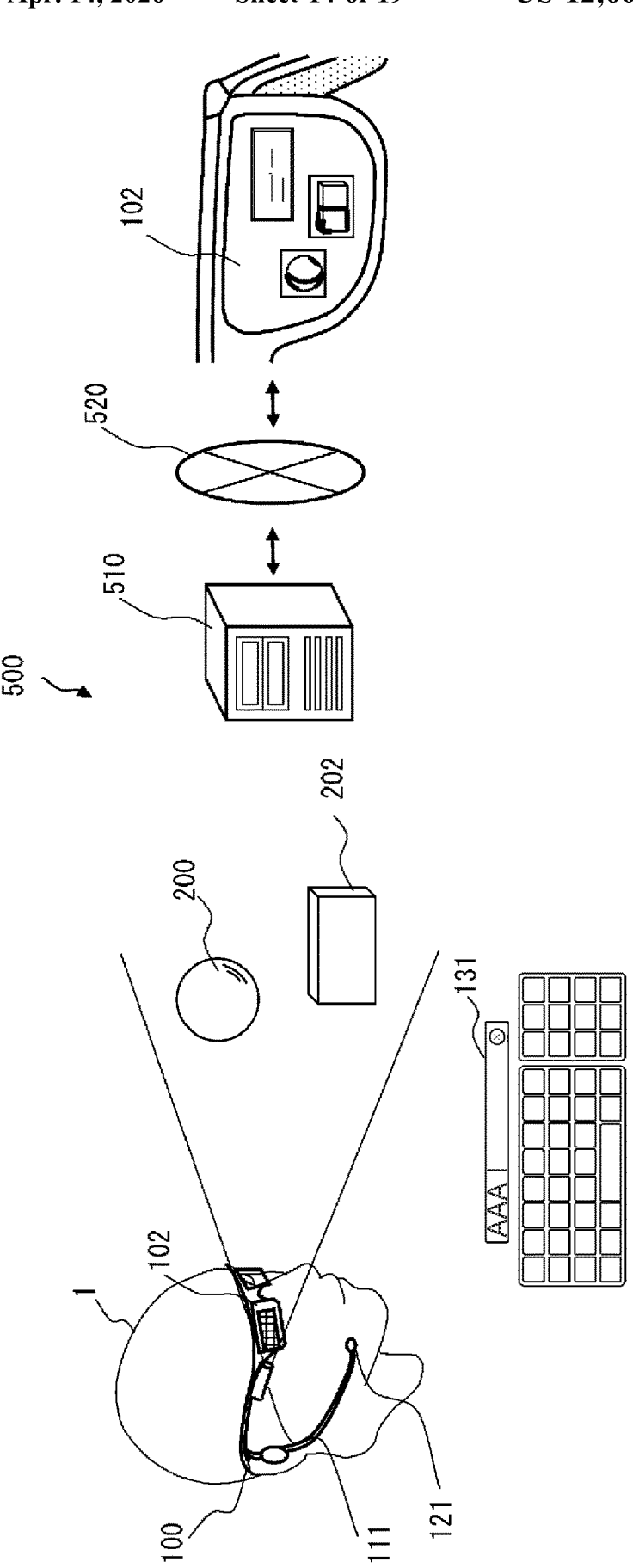
FIG. 12A illustrates an exemplified configuration of an augmented reality display system.
Figure 12B:
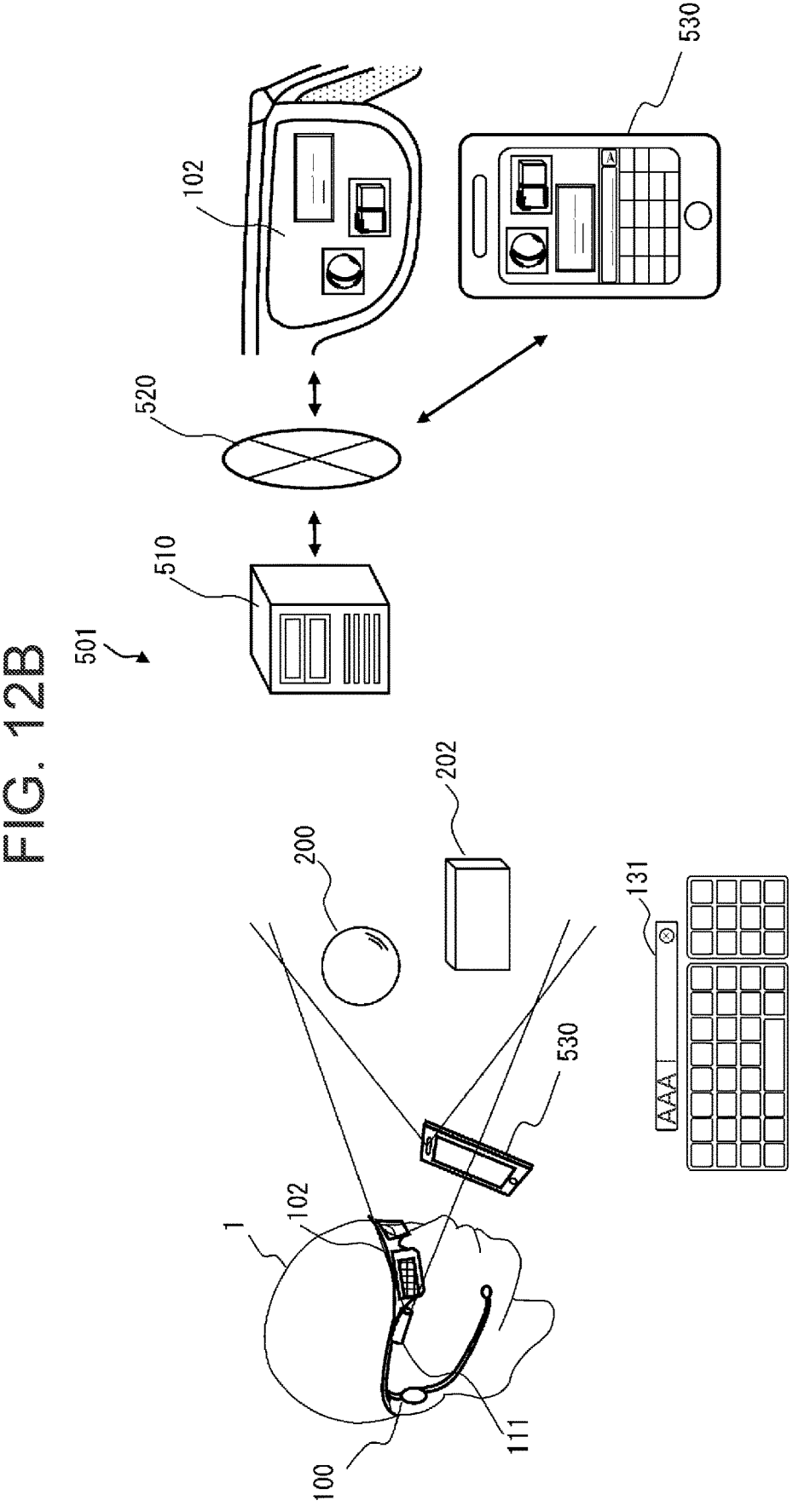
FIG. 12B illustrates an exemplified configuration of an augmented reality display system.

Each of FIG. 12A and FIG. 12B illustrates an exemplified configuration of an augmented reality display system. Each of FIG. 13A and FIG. 13B illustrates an example of information output from the HMD 100.

An augmented reality display system 500 illustrated in FIG. 12A is configured with the HMD 100 and a server 510, which are connected with each other through a communication network 520. The augmented reality display system 500 may be configured such that the server 510 carries out the audio data recognition processing on the audio data input via the microphone 121 of the HMD 100 and the analysis processing on the text input information input by means of a gesture action performed by the user 1, and the HMD 100 receives not only the density and type information, but also the result of the processing above from the server 500. In the analysis processing on the text input information, the gesture action is made with respect to an AR image such as the text input UI 131 displayed on the display 102, so that it would be recognized via the out-camera 111 and the range sensor 167.

Figure 13A:
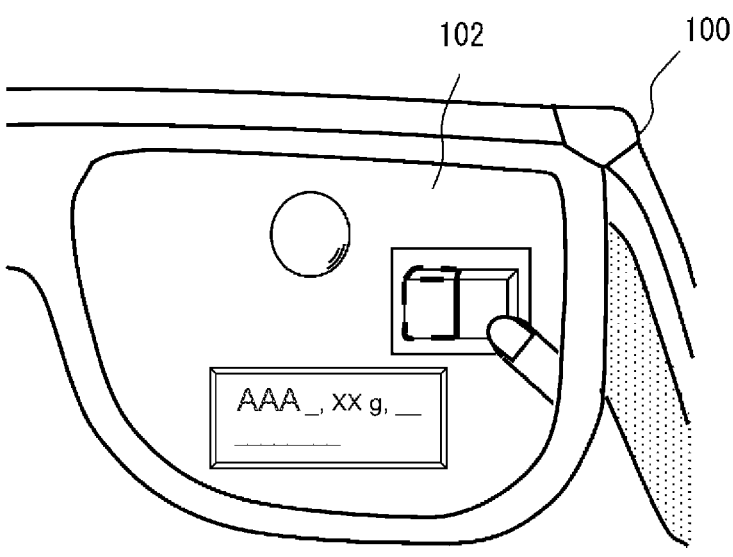
FIG. 13A illustrates an example of information output from an HMD.
Figure 13B:
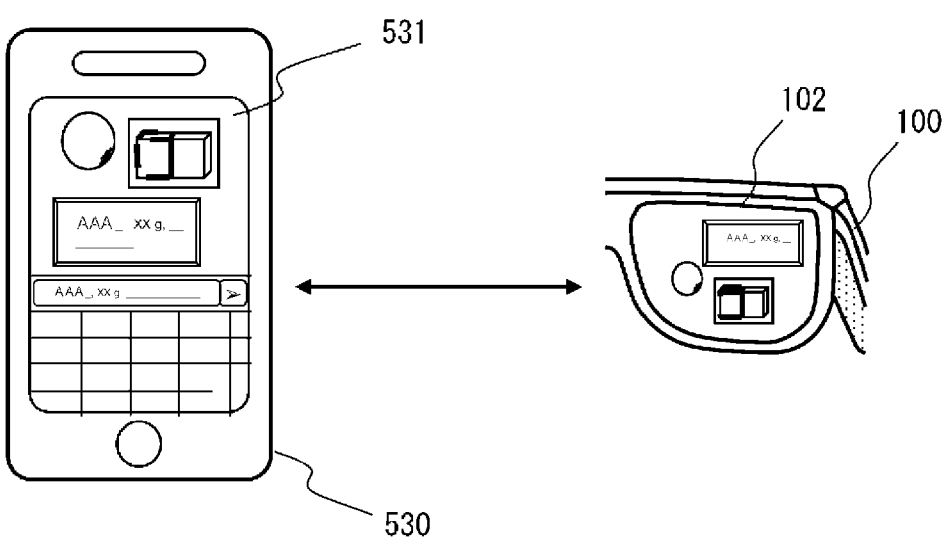
FIG. 13B illustrates an example of information output from an HMD.

Furthermore, it may be configured such that a target object is specified by recognition a gesture action made with respect to an AR on displayed the display 102 (see FIG. 13A).

An augmented reality display system 501 illustrated in FIG. 12B is configured with the HMD 100 (corresponding to the first augmented reality display device) and a smartphone 530 (corresponding to the second augmented reality display device), which are connected to with each other through the communication network 520 so as to establish a linkage therebetween. In the augmented reality display system 501, the processor 101 of the HMD 100 (corresponding to the first processor) combines an AR image displayed on the display 102 of the HMD 100 with a captured image of a real object captured by the out-camera 111 to generate a composite image, and transmits the composite image to the smartphone 530 via the wireless LAN communication unit 141 (corresponding to the first communication unit). In the case of the display 102 of a transparent type, the captured image of the real object is not being displayed on the display 102, and thus the processor 101 carries out the image composition processing by superimposing the AR image on the captured image. In the case of the display 102 of a non-transparent type, the image captured by the out-camera 111 is being displayed on the display 102 and the AR image is further being displayed on the display 102, and thus the processor 101 can transmit the image being displayed on the display 102 as a composite image to the smartphone 530A.

The smartphone 530 receives the composite image data via a wireless LAN communication unit (corresponding to the second communication unit) of the smartphone 530, and a processor (corresponding to the second processor) of the smartphone 530 displays the composite image on a display 531 (corresponding to the second display) (see FIG. 13B).

Figure 14:
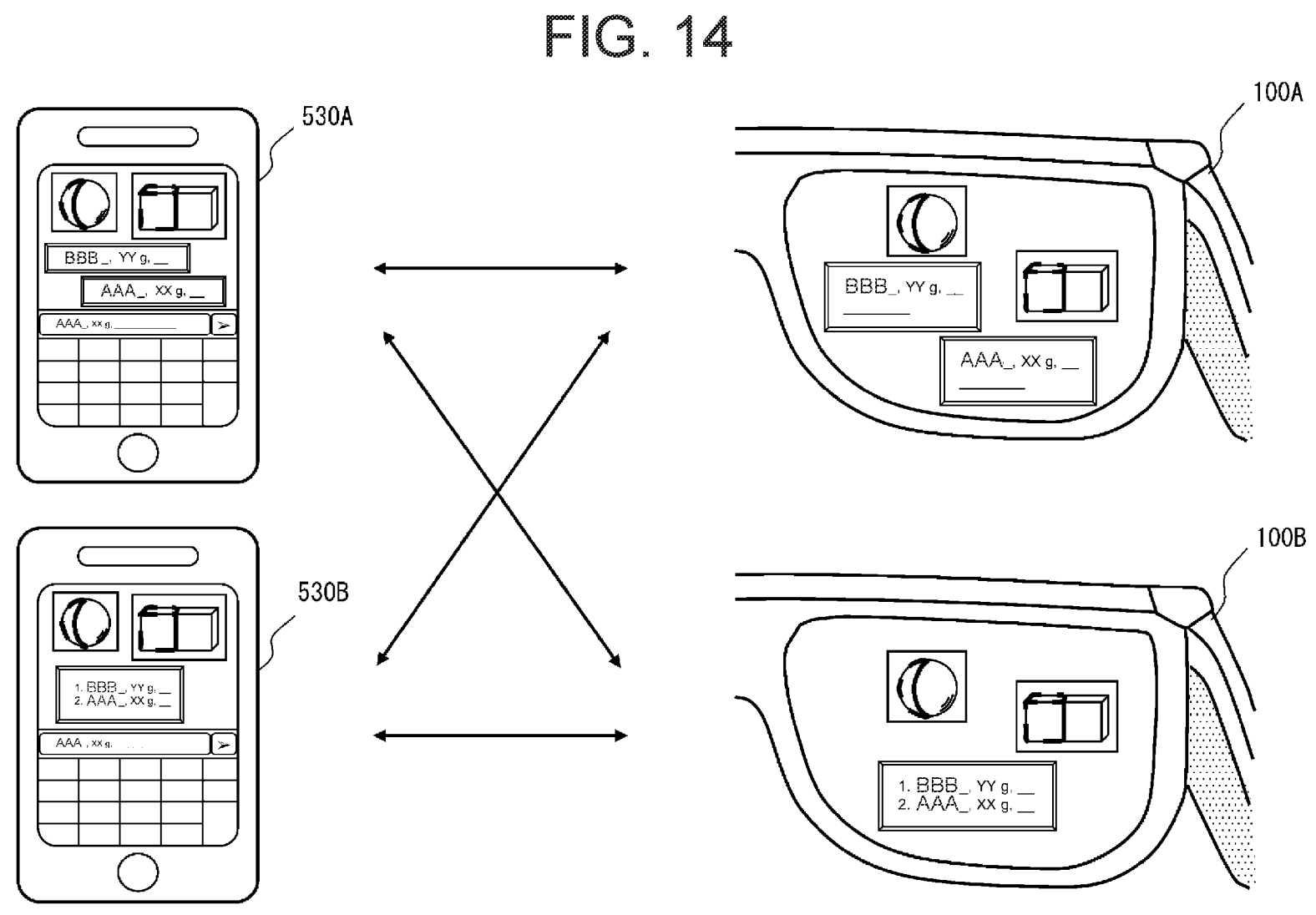

FIG. 14 illustrates an example of an augmented reality display system in which an HMD 100A and an 100B are linked to a plurality of augmented reality display devices, smartphones 530A, 530B.

The smartphone 530A, smartphone 530B, the HMD 100A, and the HMD 100B are connected to each other by communication. The smartphones 530A, 530B are displaying the target objects and AR images which are the same as those being displayed on the HMDs 100A, 100B, respectively. However, the AR images being displayed on the HMDs 100A, 100B differ with each other in their display modes.

Here, it may be configured such that the display destination of the display image of the HMD 100A may be switched from the smartphone 530A to the smartphone 530B, or the display destination of the display image of the HMD 100B may be switched from the smartphone 530B to the smartphone 530A. For example, when the user 1 of the HMD 100A provides an instruction to switch a display destination of the composite image displayed on the HMD 100A from the smartphone 530A to the smartphone 530B, the composite image displayed on the HMD 100A is transmitted to the smartphone 530B via the wireless LAN communication unit 141, and transmission of the composite image to the smartphone 530A is stopped.

Figure 15A:
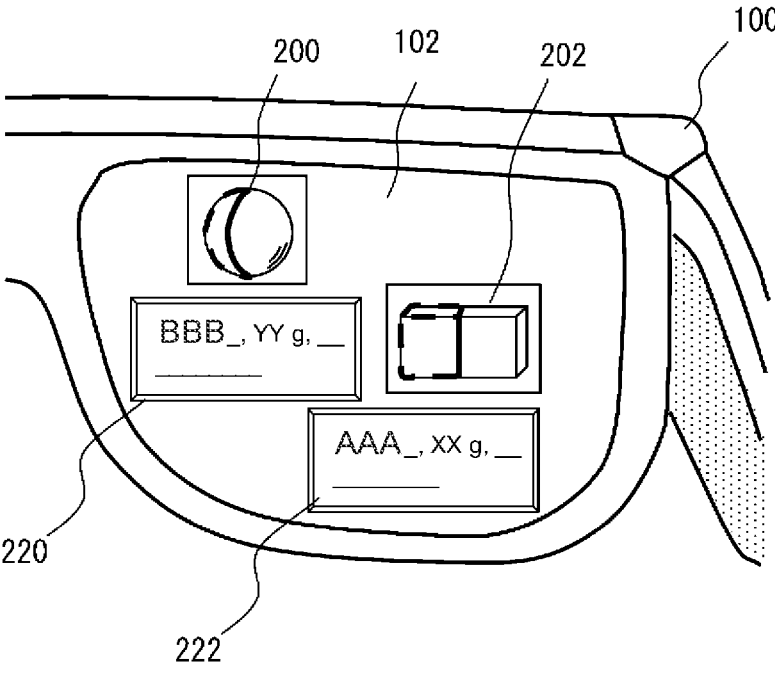
FIG. 15A illustrates an example of display of an AR image for the case of a plurality of target objects.
Figure 15B:
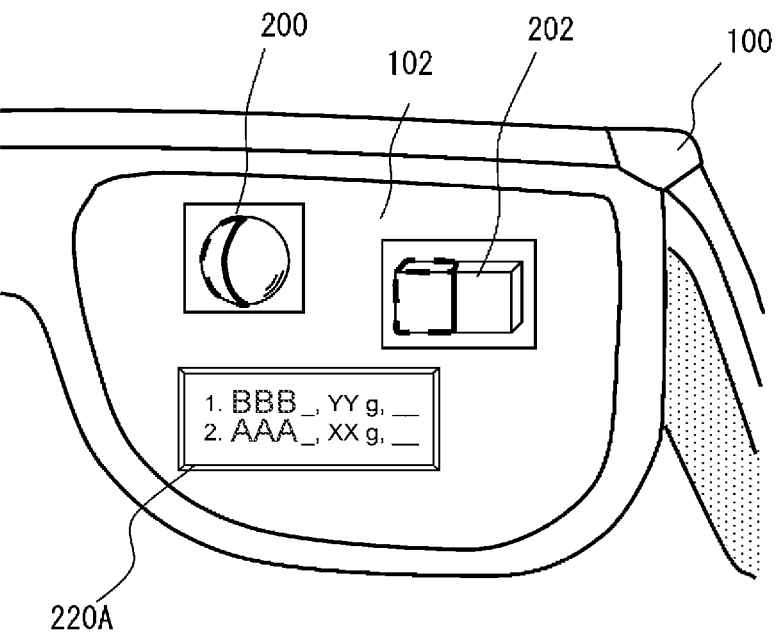
FIG. 15B illustrates an example of display of an AR image for the case of a plurality of target objects.

Each of FIG. 15A and FIG. 15B illustrates an example of display of an AR image for the case of a plurality of target objects. In FIG. 15A, an AR image of the measurement result field 220 for the target object 200 and an AR image of the measurement result field 222 for the target object 202 are made associated with the target object 200 and the target object 202 in one-to-one manner, respectively, and displayed.

In FIG. 15B, the measurement results for the target objects 200, 202 are collectively displayed in one integrated measurement result field 220A.

The user 1 may specify whether the individual measurement result fields 220, 222 are to be displayed or the integrated measurement result field 220A is to be used by means of an input operation. Alternatively, the display control section 18 of the HMD 100 may carry out switching control of whether a plurality of individual measurement result fields is to be displayed or the integrated measurement result field 220A is to be displayed depending on the size of the margin area of the display 102 where the target objects 200, 202 are not being displayed. In the integrated measurement result field 220A, the results of measurement are displayed in the order in which the target objects 200, 202 are selected.

Figure 16:
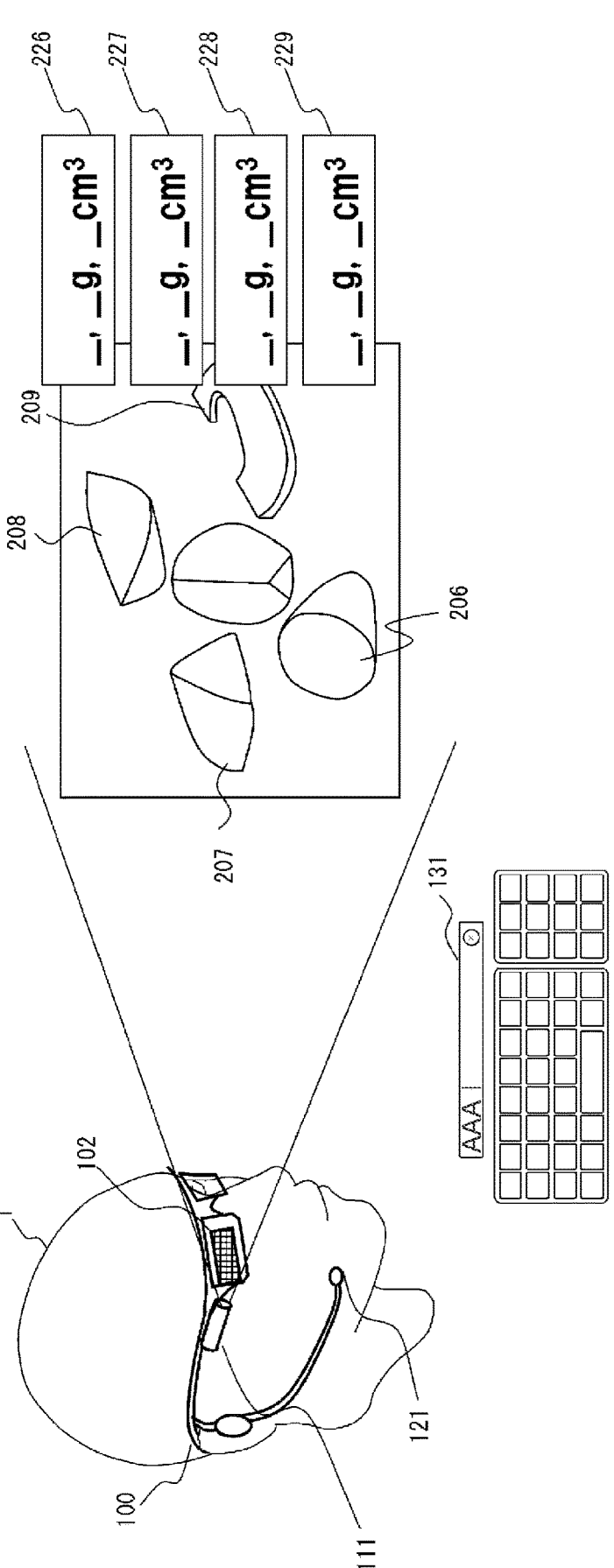
FIG. 16 illustrates an example of AR display for the case that a plurality of target objects appears to be overlapped.

FIG. 16 illustrates an example of AR display for the case that a plurality of target objects appears to be overlapped. When having simultaneously identified two or more types of the target objects 206, 207, 208, 209, the HMD 100 may detect the information about the shapes to separate the approximate masses of the plurality of target objects 206, 207, 208, 209 that are mixed with each other within a specified range and simultaneously display the plurality of measurement result fields 226, 227, 228, 229 in parallel. Here, for the objects of the same type or a part of the selected object, the mass and volume thereof may be added and displayed. In this case, for example, providing the target objects determined to be the same type with contours of the same color and displaying them enables the user 1 to easily know which objects are combined together. Furthermore, a plurality of results of measurement may be displayed in one AR display area using the integrated measurement result field as described above.

The present invention is not limited to the embodiment described above, and modifications within the concept of the present invention are included in the technical scope of the present invention.

For example, in the embodiments described above, the augmented reality display device is mounted on a head-mounted display, however, it may be mounted on a smart-glasses. In such a case, the measurement assistance program may be executed by, for example, a processor of another information processing device such as a smartphone.

The embodiments of the present invention have been described so far, however, the configuration for realizing the techniques according to the present invention is not limited to the embodiments described above, but various modifications are included. For example, a part of the configuration of the present embodiments can be replaced with that of other embodiments, and the features of other embodiments and modifications can be added to the configuration of the present embodiments. All of these are included in the scope of the present invention. The numerical values and messages appearing in the text and drawings are merely examples, and thus the advantageous effects of the present invention are not impaired even if different ones are used.

The programs described in each of the examples of the processing may be independent programs, and one application program may be configured with a plurality of programs. The order to execute each processing may be switched.

The functions and the like of the invention described above may be implemented in hardware by designing some or all of them, for example, in an integrated circuit. They may also be implemented in software by a microprocessor unit or the like interpreting and executing a program that realizes the respective functions, and the like. Hardware and software may be used together.

Furthermore, the control lines and information lines which are considered to be necessary for the purpose of explanation are indicated herein, but not all the control lines and information lines of actual products are necessarily indicated. It may be considered that almost all the configurations are actually connected to each other.

REFERENCE SIGNS LIST

1: user
11: distance image data acquisition section
12: distance image data storage
13: object detection section
14: target object identification section
15: type estimation section
16: type dictionary storage
17: physical quantity estimation section
17a: density acquisition section
17b: three-dimensional shape acquisition section
17c: volume and mass calculation section
18: display control section
19: communication control section
20: density dictionary storage
100, 100A, 100B: HMD
101: processor
102: display
103: ROM
104: RAM
105: storage
106: bus
111: out-camera
112: in-camera
121: microphone
122: speaker
130: operation button
131: text input UI
132a, 132b, 132c: reference marker display change UI
133: material and container specification UI
134: material information recording necessity selection UI 135a: material record information invocation UI
135b: material record information UI
136a: material insufficient notification UI
136b: material insufficient quantity display UI
137a: material addition necessity input UI
137b: material addition quantity display UI
141: wireless LAN communication unit
142: near-field wireless communication unit
143: telephone network communication unit
150: extended I/F
160: group of sensors
162: gyro sensor
163: geomagnetic sensor
164: acceleration sensor
165: illuminance sensor
166: proximity sensor
167: range sensor
168: line-of-sight detection sensor
180: battery
200, 201, 202, 203, 204, 206, 207, 208, 209: target object
205: real object
210, 211, 212, 213, 214, 216, 217: frame
220A: integrated measurement result field
220a, 222a: required quantity field
221, 222, 223, 224, 226, 226a, 226b, 227, 227a, 227b, 228,
229: measurement result field
230, 232, 236a, 236b, 236c, 237a, 237b, 238a, 238b, 239a,
239b: reference marker
250: rescanning notification
300: red clay soil
301: liquid fertilizer
310: frame
311: frame
320, 321, 322: required quantity field
330: planter
331: spoon
332: cup
340, 341, 342a, 342b: reference marker
500, 501: augmented reality display system
510: server
520: communication network
530, 530A, 530B: smartphone
531: display

The invention claimed is:

1. An augmented reality display device for displaying an augmented reality image, comprising:
a display:
an out-camera for capturing an image of a field of view of a user;
a range sensor configured to measure a distance to each of a plurality of measurement points on a real object to be captured by the out-camera; and
a processor connected to the display, the out-camera, and the range sensor, respectively, the processor being configured to:
detect a type of the real object captured in a captured image generated by the out-camera,
recognize a three-dimensional shape of the real object based on distance data to each of the measurement points detected by the range sensor,
estimate a volume of the real object based on the three-dimensional shape of the real object,
convert the volume of the real object to a mass based on a density of the real object, and use at least one of the mass or the volume of the real object as the physical quantity of the real object, and
display, on the display, an augmented reality image indicating a physical quantity of the real object which is based on the volume,
wherein the augmented reality display device further comprises an information input device configured to accept an input of a physical quantity indicating a required quantity of the real object,
wherein the processor is further connected to the information input device, the processor further configured to:
convert the physical quantity indicating the required quantity of the real object into a volume, and
display, on the display, an augmented reality image configured with a reference marker, the reference marker indicating an area, which expresses the volume corresponding to the required quantity of the real object, of the three-dimensional shape, and
wherein the reference marker is displayed at a position overlapping the real object on the display.
2. The augmented reality display device according to claim 1,
wherein the information input device accepts an input of physical quantities indicating a plurality of required quantities, and
wherein the processor is configured to display a plurality of reference markers indicating the plurality of required quantities, respectively, on the display.
3. The augmented reality display device according to claim 2,
wherein the processor is configured to display an augmented reality image indicating a measurement result field in which the physical quantities indicating the plurality of necessary quantities are indicated on the display.
4. The augmented reality display device according to claim 1,
wherein the information input device accepts an input of an instruction to change a display position of the reference marker, and
wherein in response to the input of the instruction to change the display position of the reference marker, the processor is configured to change display of the reference marker so as to make the reference marker adapted to a different portion of the real object and a shape of the different portion.
5. The augmented reality display device according to claim 1,
wherein the real object includes a container and a material to be contained in the container,
wherein the information input device accepts an input of a physical quantity indicating a required quantity of the material, and
wherein the processor is configured to:
convert the physical quantity indicating the required quantity of the material into a volume;
obtain a volume of an accommodation space based on a three-dimensional shape of the accommodation space of the container; and
use, as the reference marker, a three-dimensional shape in which the volume of the material is indicated in the accommodation space.
6. The augmented reality display device according to claim 5,
wherein the material of the real object is a liquid, wherein the information input device is the out-camera, and wherein in accordance with a tilt of the container captured by the out-camera, the processor is configured to change display of the reference marker so that the reference marker indicates the required quantity for a surface of the liquid kept horizontal.

7. An augmented reality display device for displaying an augmented reality image, comprising:

a display:

an out-camera for capturing an image of a field of view of a user;

a range sensor configured to measure a distance to each of a plurality of measurement points on a real object to be captured by the out-camera; and a processor connected to the display, the out-camera, and the range sensor, respectively, the processor being configured to:

detect a type of the real object captured in a captured image generated by the out-camera, recognize a three-dimensional shape of the real object based on distance data to each of the measurement points detected by the range sensor, estimate a volume of the real object based on the three-dimensional shape of the real object, and display, on the display, an augmented reality image indicating a physical quantity of the real object which is based on the volume, wherein the augmented reality display device further comprises a storage connected to the processor, wherein the processor is configured to store, in the storage, a required quantity, a required quantity ratio with respect to another real object, and a volume of the real object which is obtained by estimation, in association with the type of the real object, and wherein in measuring quantities of real objects of a plurality of types, the processor is configured to use the real object of which the quantity is most insufficient as a reference to calculate a required quantity and a required volume of the other real object based on the required quantity ratio as recorded.

\* \* \* \* \*